(12) United States Patent
Kim et al.

(10) Patent No.: US 10,131,347 B2
(45) Date of Patent: Nov. 20, 2018

(54) PARKING ASSISTANCE APPARATUS AND VEHICLE HAVING THE SAME

(71) Applicant: LG ELECTRONICS INC., Seoul (KR)

(72) Inventors: Ilho Kim, Seoul (KR); Wooseok Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 15/427,376

(22) Filed: Feb. 8, 2017

(65) Prior Publication Data

US 2018/0093662 A1  Apr. 5, 2018

(30) Foreign Application Priority Data

Oct. 4, 2016 (KR) .................. 10-2016-0127551

(51) Int. Cl.
*B60W 30/06* (2006.01)
*B60W 10/04* (2006.01)
(Continued)

(52) U.S. Cl.
CPC ............ *B60W 30/06* (2013.01); *B60K 35/00* (2013.01); *B60R 1/00* (2013.01); *B60W 10/04* (2013.01);
(Continued)

(58) Field of Classification Search
CPC ...... B60W 30/00; B60W 30/06; B60W 10/04; B60W 10/184; B60W 10/20;
(Continued)

(56) References Cited

U.S. PATENT DOCUMENTS 8,150,593 B2  4/2012  Taki
8,423,223 B2 * 4/2013 Nakamura ............ B60L 11/123
340/932.2

(Continued)

FOREIGN PATENT DOCUMENTS

JP       2008-143337 A    6/2008
JP       2014-43139 A     3/2014
(Continued)

*Primary Examiner* — Yonel Beaulieu
(74) *Attorney, Agent, or Firm* — Birch, Stewart, Kolasch & Birch, LLP

(57) ABSTRACT

A parking assistance apparatus for a vehicle, and including a camera configured to photograph surroundings of the vehicle; an interface configured to receive sensor information from the vehicle; a display configured to display a graphic image about an automatic parking function of the vehicle; and a processor configured to initiate the automatic parking function by controlling the vehicle to travel to a target parking position, detect a traveling resistance of the vehicle from the sensor information while the vehicle is traveling to the target parking position, determine a factor causing the traveling resistance, continue controlling the vehicle to travel to the target parking position when the detected traveling resistance is less than a predetermined resistance, and change the controlling of the vehicle to travel to the target parking position to offset the factor causing the traveling resistance, when the detected traveling resistance is equal to or greater than the predetermined resistance.

20 Claims, 24 Drawing Sheets

(51) Int. Cl.
    B60W 10/20      (2006.01)
    B60W 50/14      (2012.01)
    G05D 1/00       (2006.01)
    G08G 1/16       (2006.01)
    B60K 35/00      (2006.01)
    B62D 15/00      (2006.01)
    B60R 1/00       (2006.01)
    B60W 10/184     (2012.01)
    B60W 30/18      (2012.01)
    B62D 15/02      (2006.01)
    G05D 1/02       (2006.01)
    G06K 9/00       (2006.01)
    H04N 7/18       (2006.01)

(52) U.S. Cl.
    CPC .......... *B60W 10/184* (2013.01); *B60W 10/20* (2013.01); *B60W 30/18063* (2013.01); *B60W 50/14* (2013.01); *B62D 15/0285* (2013.01); *G05D 1/0219* (2013.01); *G05D 1/0231* (2013.01); *G06K 9/00791* (2013.01); *G06K 9/00805* (2013.01); *G08G 1/168* (2013.01); *H04N 7/183* (2013.01); *B60K 2350/106* (2013.01); *B60K 2350/1028* (2013.01); *B60K 2350/1084* (2013.01); *B60K 2350/2013* (2013.01); *B60K 2350/2052* (2013.01); *B60K 2350/2065* (2013.01); *B60K 2350/2095* (2013.01); *B60K 2350/965* (2013.01); *B60R 2300/107* (2013.01); *B60R 2300/205* (2013.01); *B60R 2300/207* (2013.01); *B60R 2300/301* (2013.01); *B60R 2300/806* (2013.01); *B60W 2050/146* (2013.01); *B60W 2420/42* (2013.01); *B60W 2530/16* (2013.01); *B60W 2550/142* (2013.01); *B60W 2720/24* (2013.01); *G05D 2201/0213* (2013.01)

(58) Field of Classification Search
    CPC .......... B60W 30/18063; B60W 50/00; B60W 50/14; B60K 35/00; B60R 1/00; B62D 15/00; B62D 15/0285; G05D 1/00; G05D 1/0219; G05D 1/0231; G06K 9/00; G06K 9/00805; G08G 1/16; G08G 1/168; H04N 7/183
    See application file for complete search history.

(56)         References Cited

U.S. PATENT DOCUMENTS 8,560,175  B2 * 10/2013  Bammert ......... B62D 15/0285
                                                    701/301
    9,505,436  B2 * 11/2016  Yamashita ........... B62D 15/028
    9,783,231  B2 * 10/2017  Freistadt ........... B62D 15/0285
    9,849,864  B2 * 12/2017  Bales .................. B60T 7/22
    2009/0234526 A1   9/2009  Taki
    2011/0054739 A1 *  3/2011  Bammert ............ B62D 15/028
                                                    701/41
    2012/0323423 A1 * 12/2012  Nakamura ........... B60L 11/123
                                                    701/22
    2015/0100193 A1   4/2015  Inagaki et al.
    2016/0075375 A1 *  3/2016  Yamashita ........... B62D 15/028
                                                    701/41
    2016/0257343 A1 *  9/2016  Freistadt ........... B62D 15/0285

FOREIGN PATENT DOCUMENTS

KR    10-2014-0075394 A   6/2014
    KR       10-1553868 B1    9/2015

* cited by examiner

PARKING ASSISTANCE APPARATUS AND VEHICLE HAVING THE SAME

CROSS-REFERENCE TO THE RELATED APPLICATIONS

The present application claims the benefit of priority under 35 U.S.C. § 119 and 35 U.S.C. § 365 to Korean Patent Application No. 10-2016-0127551 filed on Oct. 4, 2016, which is hereby incorporated by reference in its entirety.

BACKGROUND OF THE INVENTION

Field of the Invention

The present invention relates to a parking assistance apparatus and a vehicle having the same.

Description of the Related Art

A representative example of a vehicle is an automobile. In particular, a vehicle includes an internal combustion engine vehicle, an external combustion engine vehicle, a gas turbine vehicle, an electric vehicle, etc. according to type of motor used.

An electric vehicle is driven by an electric motor using electric energy and includes a pure electric vehicle, a hybrid electric vehicle (HEV), a plug-in hybrid electric vehicle (PHEV), a fuel cell electric vehicle (FCEV), etc. Recently, intelligent vehicles have been actively developed for safety or convenience of a driver or pedestrian. The intelligent vehicle is an advanced vehicle using information technology (IT) and is also referred to as a smart vehicle. The intelligent vehicle provides optimal traffic efficiency by introduction of an advanced vehicle system and via association with an intelligent traffic system (ITS).

In addition, research into a sensor mounted in such an intelligent vehicle has been actively conducted. More specifically, a camera, an infrared sensor, a radar, a global positioning system (GPS), a Lidar, a gyroscope, etc. are used for the intelligent vehicle. Among others, the camera is an important sensor playing the role of human eyes.

Accordingly, with development of various sensors and electronic apparatuses, a vehicle including a driver assistance function for assisting driving of a user and improving driving safety and convenience is attracting considerable attention. In particular, there is an increasing interest in automatic parking technologies for automatically parking a vehicle since a driver may have difficulty in parking her or his vehicle. One of the automatic parking technologies includes detecting a parking lane by using a camera and automatically parking a vehicle in a detected parking space within the parking lane.

In general, a camera system for finding a parking space uses an around view monitoring (AVM) system, which photographs surroundings of a vehicle, or a rear camera. In addition, there have been proposed technologies to perform image analysis of an image photographed by the camera, detect characteristics of an object included in the image, and perform an automatic parking function based on the characteristics of the object.

However, an existing automatic parking function is limited and only operates in basic comfortable and easy parking situations.

SUMMARY OF THE INVENTION

Accordingly, one aspect of the present invention is to address the above-noted and other problems of the related art.

Another aspect of the present invention is to provide a parking assistance apparatus and a vehicle having the same, which provide an automatic parking function capable of effectively coping with a traveling resistance occurring during automatic parking.

To achieve these and other advantages and in accordance with the purpose of the present invention, as embodied and broadly described herein, the present invention provides in one aspect a parking assistance apparatus for a vehicle includes a camera configured to photograph surroundings of the vehicle; an interface configured to receive sensor information from the vehicle; a display configured to display a graphic image about an automatic parking function of the vehicle; and a processor configured to initiate the automatic parking function by controlling the vehicle to travel to a target parking position, detect a traveling resistance of the vehicle from the sensor information while the vehicle is traveling to the target parking position, determine a factor causing the traveling resistance, continue controlling the vehicle to travel to the target parking position when the detected traveling resistance is less than a predetermined resistance, and change the controlling of the vehicle to travel to the target parking position to offset the factor causing the traveling resistance, when the detected traveling resistance is equal to or greater than the predetermined resistance. The present invention also provides a corresponding vehicle including the parking assistance apparatus.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1:
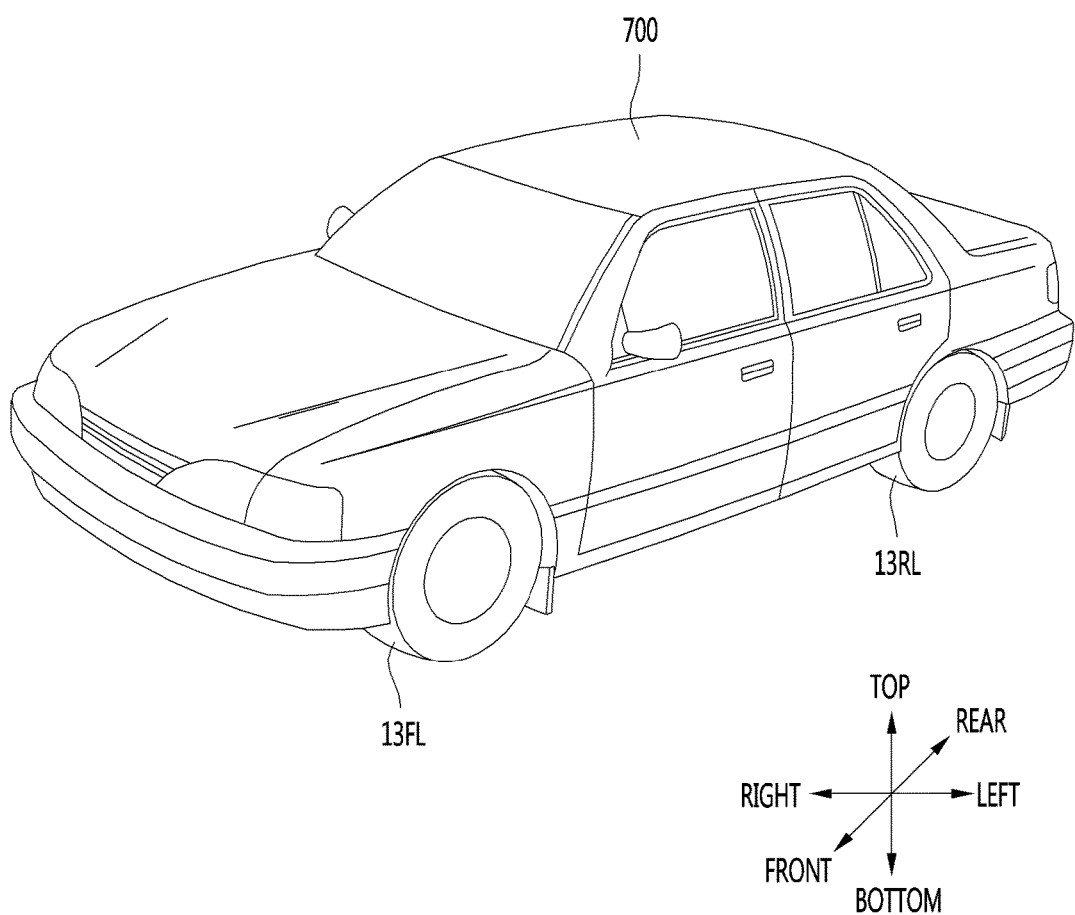
FIG. 1 is a diagram showing the appearance of a vehicle having a parking assistance apparatus according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are used only in consideration of ease in preparation of the specification, and do not have distinct meanings. Accordingly, the suffixes "module" and "unit" may be used interchangeably. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

Although the terms first, second, etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include a car and a motorcycle. Hereinafter, a car will be focused upon. A vehicle as described in this specification may include all of an internal combustion engine vehicle including an engine as a power source, a hybrid vehicle including both an engine and an electric motor as a power source, and an electric vehicle including an electric motor as a power source.

In the following description, and as shown in FIG. 1, the left of a vehicle 700 means the left of the vehicle in the direction of travel and the right of the vehicle means the right of the vehicle in the direction of travel. In the following description, a left hand drive (LHD) vehicle will be focused upon unless otherwise stated. In the following description, the parking assistance apparatus is provided in a vehicle to exchange information necessary for data communication with the vehicle and to perform a parking assistance function. A set of some units of the vehicle may be defined as a parking assistance apparatus.

When the parking assistance apparatus is separately provided, at least some units (see FIG. 2) of the parking assistance apparatus are not included in the parking assistance apparatus but may be units of the vehicle or units of another apparatus mounted in the vehicle. Such external units transmit and receive data via an interface of the parking assistance apparatus and thus may be understood as being included in the parking assistance apparatus.

Hereinafter, for convenience of description, assume that the parking assistance apparatus according to the embodiment directly includes the units shown in FIG. 2. Hereinafter, the parking assistance apparatus according to the embodiment will be described in detail with reference to the drawings. Referring to FIG. 1, the vehicle 700 according to the embodiment includes wheels 13FL and 13RL rotated by a power source and a parking assistance apparatus for providing driver assistance information to a user.

When detecting a traveling resistance during automatic parking, the parking assistance apparatus 100 according to the present embodiment determines a factor causing the traveling resistance and performs an automatic parking function corresponding to the determined factor of the traveling resistance, thus providing an automatic parking function even when a vehicle is parking under poor conditions.

Specifically, the parking assistance apparatus 100 can detect the traveling resistance caused by an object placed on a road when the vehicle is traveling, scan characteristics of the object, and perform control such that vehicle passes over the object according to the characteristics of the object, thus performing the automatic parking function. In addition, the parking assistance apparatus 100 can redesign a parking path avoiding the object and perform the automatic parking function.

In particular, the parking assistance apparatus 100 can control the vehicle in a creeping mode with an output torque fixed for safety to perform the automatic parking function, and when detecting the traveling resistance, control a basic torque of the creeping mode to perform the automatic parking function, thus achieving safe automatic parking. Also, the parking assistance apparatus 100 can detect a slope included in the parking path and control the basic torque of the creeping mode corresponding to a gradient of the slope, providing the automatic parking function even in the slope.

Figure 2:
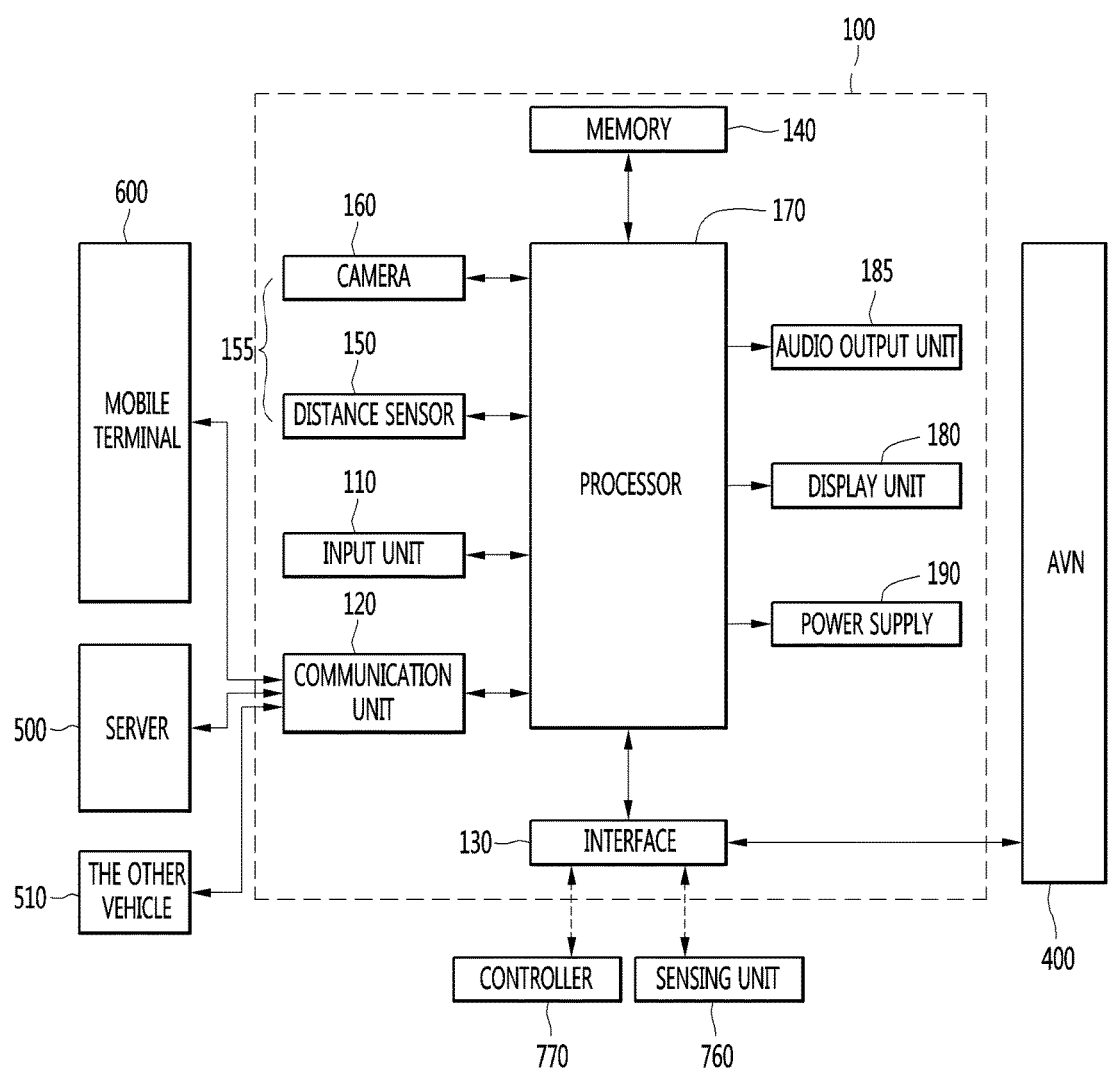
FIG. 2 is a block diagram of a parking assistance apparatus according to an embodiment of the present invention.

Referring to FIG. 2, such a parking assistance apparatus 100 can include an input unit 110, a communication unit 120, an interface 130, a memory 140, a sensor unit 155, a processor 170, a display unit 180, an audio output unit 185 and a power supply 190. However, the parking assistance apparatus 100 described in the present specification may have components greater or less in number than the number of the above-described components.

Each component will now be described in detail. The parking assistance apparatus 100 can include the input unit 110 for receiving user input. For example, a user can input a signal for setting a parking assistance function provided by the parking assistance apparatus 100 or an execution signal for turning the parking assistance apparatus 100 on/off.

In an embodiment, the input unit 110 can receive an input with respect to the performance of the automatic parking function, an input with respect to how to cope with the traveling resistance, an input with respect to whether to continuously perform the automatic parking function, or the like. The input unit 110 includes at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the parking assistance apparatus 100 can include the communication unit 120 for communicating with another vehicle 510, a terminal 600 and a server 500. The parking assistance apparatus 100 can receive communication information including at least one of navigation information, driving information of another vehicle and traffic information via the communication unit 120. The parking assistance apparatus 100 can also transmit information on this vehicle via the communication unit 120.

In an embodiment, the communication unit 120 can receive navigation information, information about traveling of other vehicles, traffic information, or the like, and the received information can be used to acquire information about a factor of traveling resistance and measure a gradient of a parking path. In more detail, the communication unit 120 can receive at least one of position information, weather information and road traffic condition information (e.g., transport protocol experts group (TPEG), etc.) from the mobile terminal 600 and/or the server 500.

The communication unit 120 can receive traffic information from the server 500 having an intelligent traffic system (ITS). Here, the traffic information may include traffic signal information, lane information, vehicle surrounding information or position information. In addition, the communication unit 120 can receive navigation information from the server 500 and/or the mobile terminal 600. Here, the navigation information may include at least one of map information related to vehicle driving, lane information, vehicle position information, set destination information and route information according to the destination.

For example, the communication unit 120 can receive the real-time position of the vehicle as the navigation information. In more detail, the communication unit 120 may include a global positioning system (GPS) module and/or a Wi-Fi (Wireless Fidelity) module and acquire the position of the vehicle. In addition, the communication unit 120 can receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the parking assistance apparatus 100 can pair with each other automatically or by executing a user application. The communication unit 120 can exchange data with the other vehicle 510, the mobile terminal 600 or the server 500 in a wireless manner.

In more detail, the communication module 120 can perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit module 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the parking assistance apparatus 100 can pair with the mobile terminal located inside the vehicle using a short-range communication method and wirelessly exchange data with the other vehicle 510 or the server 500 using a long-distance wireless communication module of the mobile terminal.

Next, the parking assistance apparatus 100 can include the interface 130 for receiving data of the vehicle and transmitting a signal processed or generated by the processor 170. In more detail, the parking assistance apparatus 100 can receive at least one of driving information of another vehicle, navigation information and sensor information via the interface 130.

In an embodiment, the interface unit 130 can receive various sensor information of the vehicle from a control unit or a sensing unit of the vehicle. The received sensor information may be used to detect a traveling resistance or determine a factor of the traveling resistance. Specifically, the processor 170 can extract an output of the vehicle, a movement distance per an output of the vehicle, or the like from the sensor information and detect whether there is a traveling resistance, whether to travel on a slope, or the like, based on the movement distance per an output of the vehicle.

In addition, the parking assistance apparatus 100 can transmit a control signal for executing an automatic parking function or information generated by the parking assistance apparatus 100 to the controller 770 of the vehicle via the interface 130. In an embodiment, the interface unit 130 can transmit various control signals for the processor 170 to control the traveling of the vehicle, or the like to the control unit of the vehicle or a power unit of the vehicle. For example, the interface unit 130 can transmit a power control signal, a steering control signal, a break control signal, or the like, which is generated by the processor 170, to the power unit of the vehicle, thus controlling traveling of the vehicle upon automatic parking.

Further, the interface 130 can perform data communication with at least one of the controller 770 of the vehicle, an audio-video-navigation (AVN) apparatus 400 and the sensing unit 760 using a wired or wireless communication method. In more detail, the interface 130 can receive navigation information by data communication with the controller 770, the AVN apparatus 400 and/or a separate navigation apparatus.

In addition, the interface 130 can receive sensor information from the controller 770 or the sensing unit 760. Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information can be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 can receive user input via the user input unit 110 of the vehicle and receive user input from the input unit of the vehicle or via the controller 770. That is, when the input unit is provided in the vehicle, user input can be received via the interface 130. In addition, the interface 130 can receive traffic information acquired from the server. The server 500 may be located at a traffic control surveillance center for controlling traffic. For example, when traffic information is received from the server 500 via the communication unit 120 of the vehicle, the interface 130 can receive traffic information from the controller 770.

Next, the memory 140 can store a variety of data for overall operation of the parking assistance apparatus 100, such as a program for processing or control of the controller 170. In addition, the memory 140 can store data and commands for operation of the parking assistance apparatus 100 and a plurality of application programs or applications executed in the parking assistance apparatus 100. At least some of such application programs can be downloaded from an external server through wireless communication. At least one of such application programs can be installed in the parking assistance apparatus 100 upon release, in order to provide the basic function (e.g., the driver assistance information guide function) of the parking assistance apparatus 100.

Such application programs can be stored in the memory 140 and be executed to perform operation (or function) of the parking assistance apparatus 100 by the processor 170. The memory 140 can store data for checking an object included in an image. For example, the memory 140 can store data for checking a predetermined object using a predetermined algorithm when the predetermined object is detected from an image of the vicinity of the vehicle acquired through the camera 160.

For example, the memory 140 can store data for checking the object using the predetermined algorithm when the predetermined algorithm such as a lane, a traffic sign, a two-wheeled vehicle and a pedestrian is included in an image acquired through the camera 160. The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the parking assistance apparatus 100 can operate in association with a network storage for performing a storage function of the memory 140 over the Internet. Next, the parking assistance apparatus 100 can further include the sensor unit 155 for sensing objects located in the vicinity of the vehicle. The parking assistance apparatus 100 can include the sensor unit 155 for sensing peripheral objects and can receive the sensor information obtained by the sensing unit 770 of the vehicle via the interface 130. The acquired sensor information may be included in the information on the vehicle surrounding information.

In an embodiment, the sensor unit 155 can detect an object around the vehicle and acquire object information used for automatic parking. In particular, the sensor unit 155 can detect a traveling resistance, detect an object causing the traveling resistance, and aid in determination and scanning of a factor causing the traveling resistance. The sensor unit 155 can include at least one of a distance sensor 150 for sensing the position of an object located in the vicinity of the vehicle and a camera 160 for capturing the image of the vicinity of the vehicle.

First, the distance sensor 150 can accurately sense the position of the object located in the vicinity of the vehicle, a distance between the object and the vehicle, a movement direction of the object, etc. The distance sensor 150 can continuously measure the position of the sensed object to accurately sense change in positional relationship with the vehicle. The distance sensor 150 can also sense the object located in at least one of the front, rear, left and right areas of the vehicle. The distance sensor 150 may be provided at various positions of the vehicle.

Figure 3:
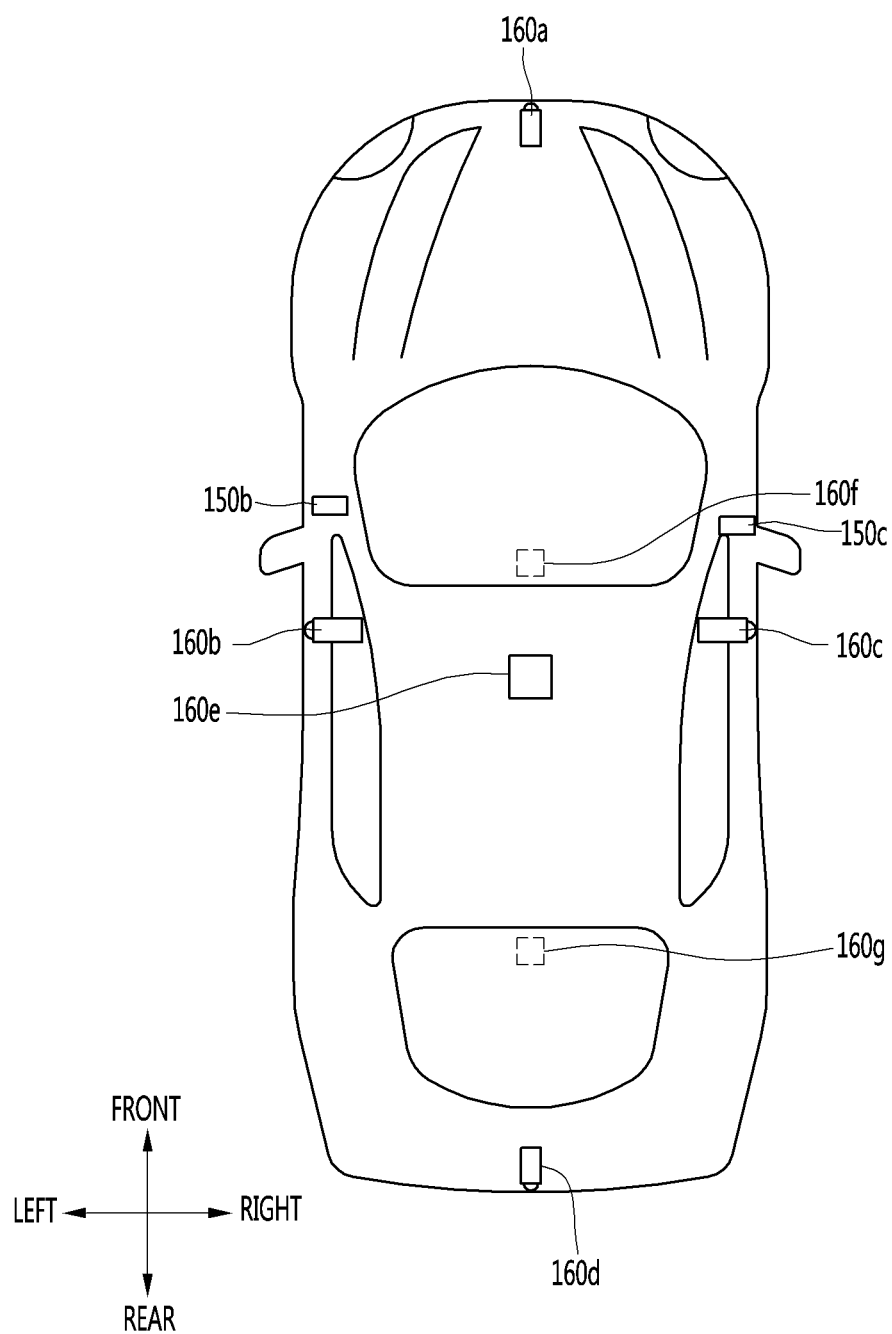
FIG. 3 is a plan view of a vehicle having a parking assistance apparatus according to an embodiment of the present invention.

In more detail, referring to FIG. 3, the distance sensor 150 can be provided at least one of the front, rear, left and right sides and ceiling of the vehicle. The distance sensor 150 may include at least one of various distance measurement sensors such as a Lidar sensor, a laser sensor, an ultrasonic wave sensor and a stereo camera. For example, the distance sensor 150 is a laser sensor and may accurately measure a positional relationship between the vehicle and the object using a time-of-flight (TOF) and/or a phase-shift method according to a laser signal modulation method. FIG. 3 illustrates multiple distance sensors 150a and 150b.

Information on the object can be acquired by analyzing the image captured by the camera 160 at the processor 170. In more detail, the parking assistance apparatus 100 can capture the image of the vicinity of the vehicle using the camera 160, analyze the image of the vicinity of the vehicle using the processor 170, detect the object located in the vicinity of the vehicle, determine the attributes of the object and generate sensor information.

The image information is at least one of the type of the object, traffic signal information indicated by the object, the distance between the object and the vehicle and the position of the object and may be included in the sensor information. In more detail, the processor 170 can detect the object from the captured image via image processing, track the object, measure the distance from the object, and check the object to analyze the object, thereby generating image information.

The camera 160 may be provided at various positions. In more detail, the camera 160 may include an internal camera 160f for capturing an image of the front side of the vehicle within the vehicle and acquiring a front image.

Referring to FIG. 3, a plurality of cameras 160 may be provided at least one of the front, rear, right and left and ceiling of the vehicle. In more detail, the left camera 160b may be provided inside a case surrounding a left side mirror. The left camera 160b may be provided outside the case surrounding the left side mirror. Alternatively, the left camera 160b may also be provided in one of a left front door, a left rear door or an outer area of a left fender.

The right camera 160c may be provided inside a case surrounding a right side mirror. Alternatively, the right camera 160c may be provided outside the case surrounding the right side mirror. Alternatively, the right camera 160c may be provided in one of a right front door, a right rear door or an outer area of a right fender. In addition, the rear camera 160d may be provided in the vicinity of a rear license plate or a trunk switch. The front camera 160a may be provided in the vicinity of an emblem or a radiator grill. A camera 160g is also shown.

The processor 170 can synthesize images captured in all directions and provide an around view image viewed from the top of the vehicle. Upon generating the around view image, boundary portions between the image regions occur. Such boundary portions may be subjected to image blending for natural display. In addition, the ceiling camera 160e may be provided on the ceiling of the vehicle to capture the image of the vehicle in all directions.

The camera 160 may directly include an image sensor and an image processing module. The camera 160 may process a still image or a moving image obtained by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, in the embodiment, the camera 160 may be a stereo camera for capturing an image and, at the same time, measuring a distance from an object. The sensor unit 155 may be a stereo camera including the distance sensor 150 and the camera 160. That is, the stereo camera can acquire an image and, at the same time, sense a positional relationship with the object.

Figure 4:
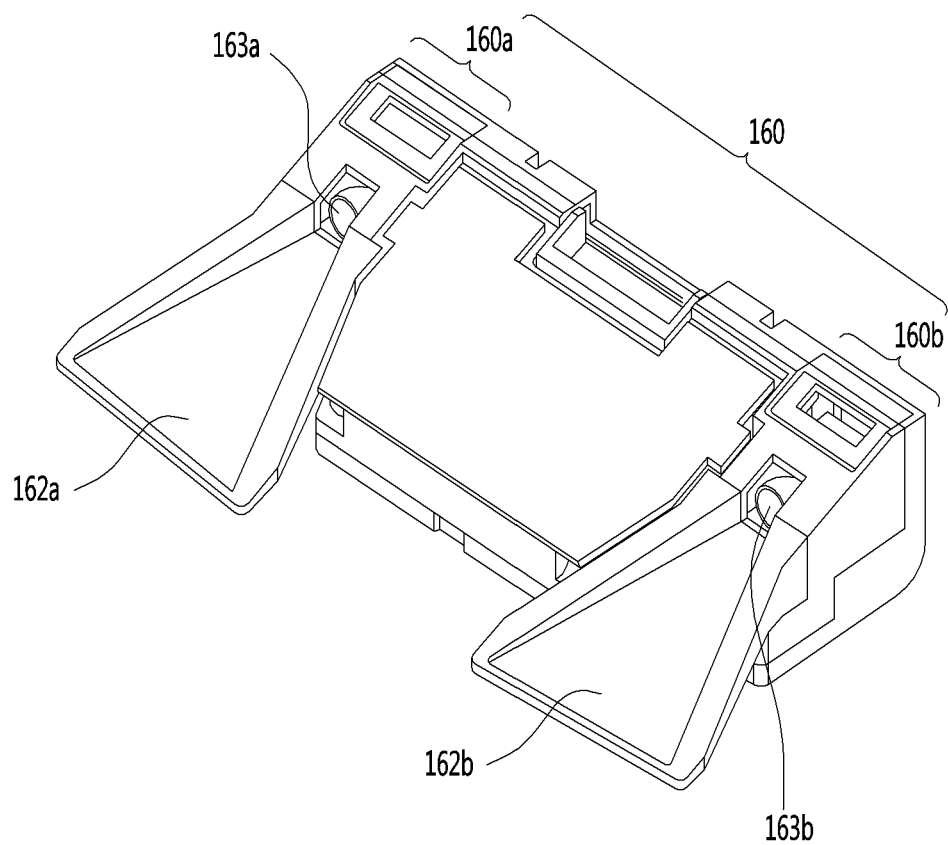
FIG. 4 is a diagram showing an example of a camera according to an embodiment of the present invention.

Hereinafter, referring to FIGS. 4 to 6, the stereo camera and a method of detecting image information by the processor 170 using the stereo camera will be described in greater detail. First, referring to FIG. 4, the stereo camera 160 may include a first camera 160a including a first lens 163a and a second camera 160b including a second lens 163b.

The parking assistance apparatus 100 can further include first and second light shield units 162a and 162b for shielding light incident upon the first and second lenses 163a and 163b. The parking assistance apparatus 100 can acquire stereo images of the vicinity of the vehicle from the first and second cameras 160a and 160b, detect disparity based on the stereo images, detect an object from at least one stereo image, and continuously track movement of the object after object detection.

Figure 5:
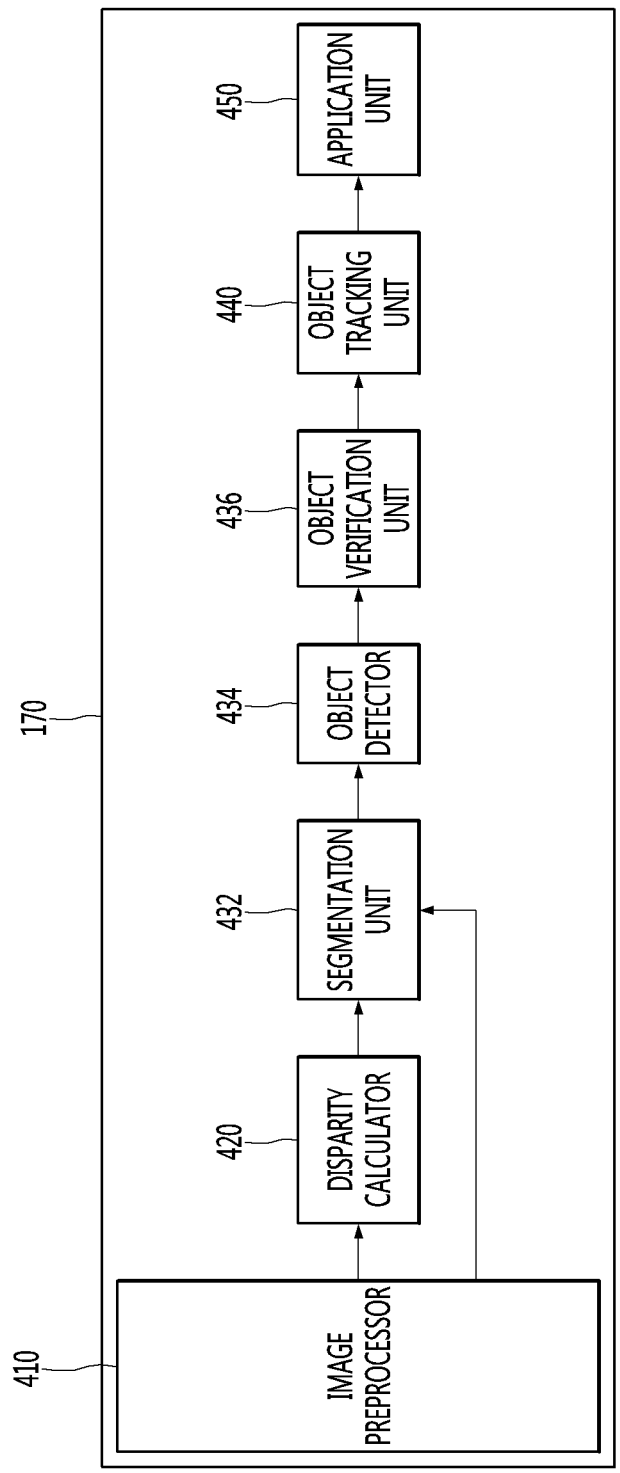
FIGS. 5 and 6 are diagrams illustrating an example of a method of generating image information from an image of a camera according to an embodiment of the present invention.

Referring to FIG. 5, as one example of the block diagram of the internal configuration of the processor 170, the processor 170 of the parking assistance apparatus 100 can include an image preprocessor 410, a disparity calculator 420, a segmentation unit 432, an object detector 434, an object verification unit 436, an object tracking unit 440 and an application unit 450. Although an image is processed in order of the image preprocessor 410, the disparity calculator 420, the segmentation unit 432, the object detector 434, the object verification unit 436, the object tracking unit 440 and the application unit 450 in FIG. 5 and the following description, the present invention is not limited thereto.

The image preprocessor 410 can receive an image from the camera 160 and perform preprocessing. In more detail, the image preprocessor 410 can perform noise reduction, rectification, calibration, color enhancement, color space conversion (CSC), interpolation, camera gain control, etc. of the image. An image having definition higher than that of the stereo image captured by the camera 160 may be acquired.

The disparity calculator 420 can receive the images processed by the image preprocessor 410, perform stereo matching of the received images, and acquire a disparity map according to stereo matching. That is, disparity information of the stereo image of the front side of the vehicle can be acquired. Stereo matching can also be performed in units of pixels of the stereo images or predetermined block units. The disparity map may refer to a map indicating the numerical value of binocular parallax information of the stereo images, that is, the left and right images.

The segmentation unit 432 can perform segmentation and clustering with respect to at least one image based on the disparity information from the disparity calculator 420. In more detail, the segmentation unit 432 can segment at least one stereo image into a background and a foreground based on the disparity information.

For example, an area in which the disparity information is less than or equal to a predetermined value within the disparity map can be calculated as the background and excluded. Therefore, the foreground can be segmented. As another example, an area in which the disparity information is greater than or equal to a predetermined value within the disparity map can be calculated as the foreground and extracted. Therefore, the foreground can be segmented.

The background and the foreground can be segmented based on the disparity information extracted based on the stereo images to reduce signal processing speed, the amount of processed signals, etc. upon object detection. Next, the object detector 434 can detect the object based on the image segment from the segmentation unit 432.

That is, the object detector 434 can detect the object from at least one image based on the disparity information. In more detail, the object detector 434 can detect the object from at least one image. For example, the object may be detected from the foreground segmented by image segmentation.

Next, the object verification unit 436 can classify and verify the segmented object. Thus, the object verification unit 436 can use an identification method using a neural network, a support vector machine (SVM) method, an identification method by AdaBoost using Haar-like features or histograms of oriented gradients (HOG) method.

The object verification unit 436 can compare the objects stored in the memory 140 and the detected object and verify the object. For example, the object verification unit 436 can verify a peripheral vehicle, a lane, a road surface, a traffic sign, a danger zone, a tunnel, etc. located in the vicinity of the vehicle.

The object tracking unit 440 can track the verified object. For example, the objects in the sequentially acquired stereo images can be verified, motion or motion vectors of the verified objects can be calculated and motion of the objects may be tracked based on the calculated motion or motion vectors. A peripheral vehicle, a lane, a road surface, a traffic sign, a danger zone, a tunnel, etc. located in the vicinity of the vehicle can be tracked.

Next, the application unit 450 can calculate a degree of risk, etc. based on various objects located in the vicinity of the vehicle, for example, another vehicle, a lane, a road surface, a traffic sign, etc. In addition, possibility of collision with a preceding vehicle, whether a vehicle slips, etc. can be calculated.

The application unit 450 can output a message indicating such information to the user as driver assistance information based on the calculated degree of risk, possibility of collision or slip. Alternatively, a control signal for vehicle attitude control or driving control can be generated as vehicle control information. The image preprocessor 410, the disparity calculator 420, the segmentation unit 432, the object detector 434, the object verification unit 436, the object tracking unit 440 and the application unit 450 may be included in the image processor (see FIG. 2) of the processor 170.

In some embodiments, the processor 170 can include only some of the image preprocessor 410, the disparity calculator 420, the segmentation unit 432, the object detector 434, the object verification unit 436, the object tracking unit 440 and the application unit 450. If the camera 160 includes a mono camera 160 or an around view camera 160, the disparity calculator 420 may be excluded. In some embodiments, the segmentation unit 432 may be excluded.

Figure 6:
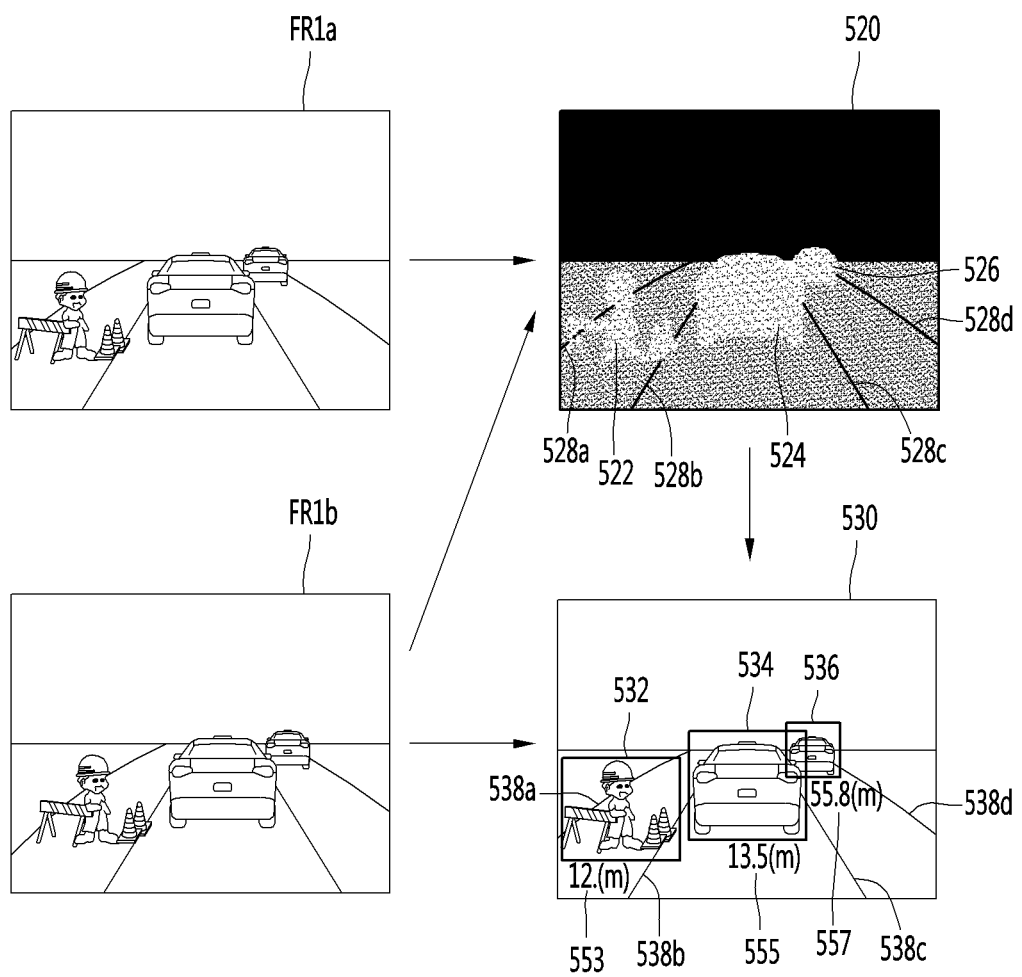

Referring to FIG. 6, during a first frame period, the camera 160 can acquire stereo images. The disparity calculator 420 of the processor 160 receives stereo images FR1a and FR1b processed by the image preprocessor 410, performs stereo matching with respect to the stereo images FR1a and FR1b and acquires a disparity map 520.

The disparity map 520 indicates the levels of binocular parallax between the stereo images FR1a and FR1b. As a disparity level increases, a distance from a vehicle may decrease and, as the disparity level decreases, the distance from the vehicle may increase. When such a disparity map is displayed, luminance may increase as the disparity level increases and decrease as the disparity level decreases.

In the figure, disparity levels respectively corresponding to first to fourth lanes 528a, 528b, 528c and 528d and disparity levels respectively corresponding to a construction area 522, a first preceding vehicle 524 and a second preceding vehicle 526 are included in the disparity map 520. The segmentation unit 432, the object detector 434 and the object verification unit 436 can perform segmentation, object detection and object verification with respect to at least one of the stereo images FR1a and FR1b based on the disparity map 520.

In the figure, object detection and verification are performed with respect to the second stereo image FR1b using the disparity map 520. That is, object detection and verification are performed with respect to the first to fourth lanes 538a, 538b, 538c and 538d, the construction area 532, the first preceding vehicle 534 and the second preceding vehicle 536 of the image 530. With image processing, the parking assistance apparatus 100 can acquire various surrounding information of the vehicle, such as peripheral objects or the positions of the peripheral objects, using the sensor unit 155, as sensor information. Object distances 553, 555 and 557 are also shown in FIG. 6.

Figure 7:
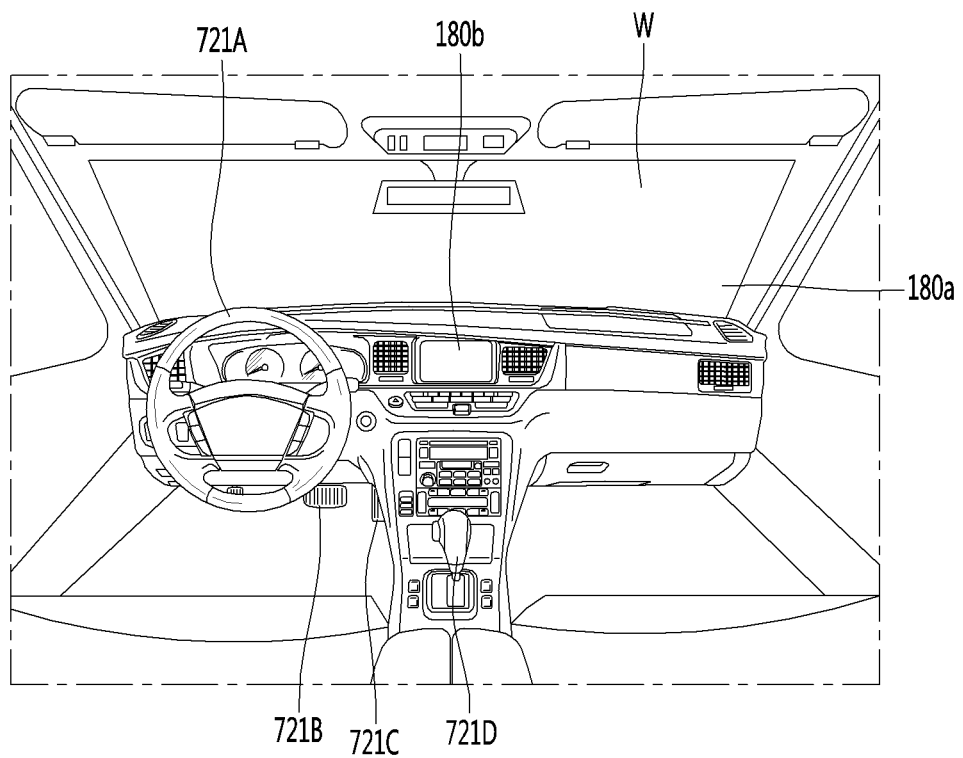
FIG. 7 is a diagram showing the inside of a vehicle having a parking assistance apparatus according to an embodiment of the present invention.

Next, as shown in FIG. 7, the parking assistance apparatus 100 can further include the display unit 180 for displaying a graphic image of the parking assistance function. The display unit 180 may include a plurality of displays. In more detail, the display unit 180 may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user can simultaneously view the front and rear sides of the graphic image.

The graphic image may overlap the image projected onto the windshield W to achieve augmented reality (AR). The display unit may include a second display 180b separately provided inside the vehicle to display an image of the parking assistance function. In more detail, the second display 180b may be a display of a vehicle navigation apparatus or a cluster located at an internal front side of the vehicle.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display. The second display 180b may be combined with a touch input unit to achieve a touchscreen. A steering input unit 721A, a shift input unit 721D, an acceleration input unit 721C and a brake input unit 721B are also shown in FIG. 7.

Next, the audio output unit 185 can audibly output a message illustrating the function of the parking assistance apparatus 100 and checking whether the parking assistance function is performed. That is, the parking assistance apparatus 100 can provide explanation of the function of the parking assistance apparatus 100 via visual display of the display unit 180 and audio output of the audio output unit 185.

In addition, a haptic output unit can output an alarm for the parking assistance function in a haptic manner. For example, the parking assistance apparatus 100 can output vibration to the user when a warning is included in at least one of navigation information, traffic information, communication information, vehicle state information, advanced driver assistance system (ADAS) function and other driver convenience information.

The haptic output unit can provide directional vibration. For example, the haptic output unit may be provided in a steering apparatus for controlling steering to output vibration. Left or right vibration may also be output according to the left and right sides of the steering apparatus to enable directional haptic output.

In addition, the power supply 190 can receive power and supply power used for operation of the components under control of the processor 170. Lastly, the parking assistance apparatus 100 can include the processor 170 for controlling overall operation of the units of the parking assistance apparatus 100. In addition, the processor 170 can control at least some of the components described with reference to FIG. 2 in order to execute the application program. Further, the processor 170 can operate by combining at least two of the components included in the parking assistance apparatuses 100, in order to execute the application program.

The processor 170 can be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors 170, and electric units for the implementation of other functions.

The processor 170 can be controlled by the controller or control various functions of the vehicle through the controller. The processor 170 can control overall operation of the parking assistance apparatus 100 in addition to operation related to the application programs stored in the memory 140. The processor 170 can process signals, data, information, etc. via the above-described components or execute the application programs stored in the memory 170 to provide appropriate information or functions to the user.

Figure 8:
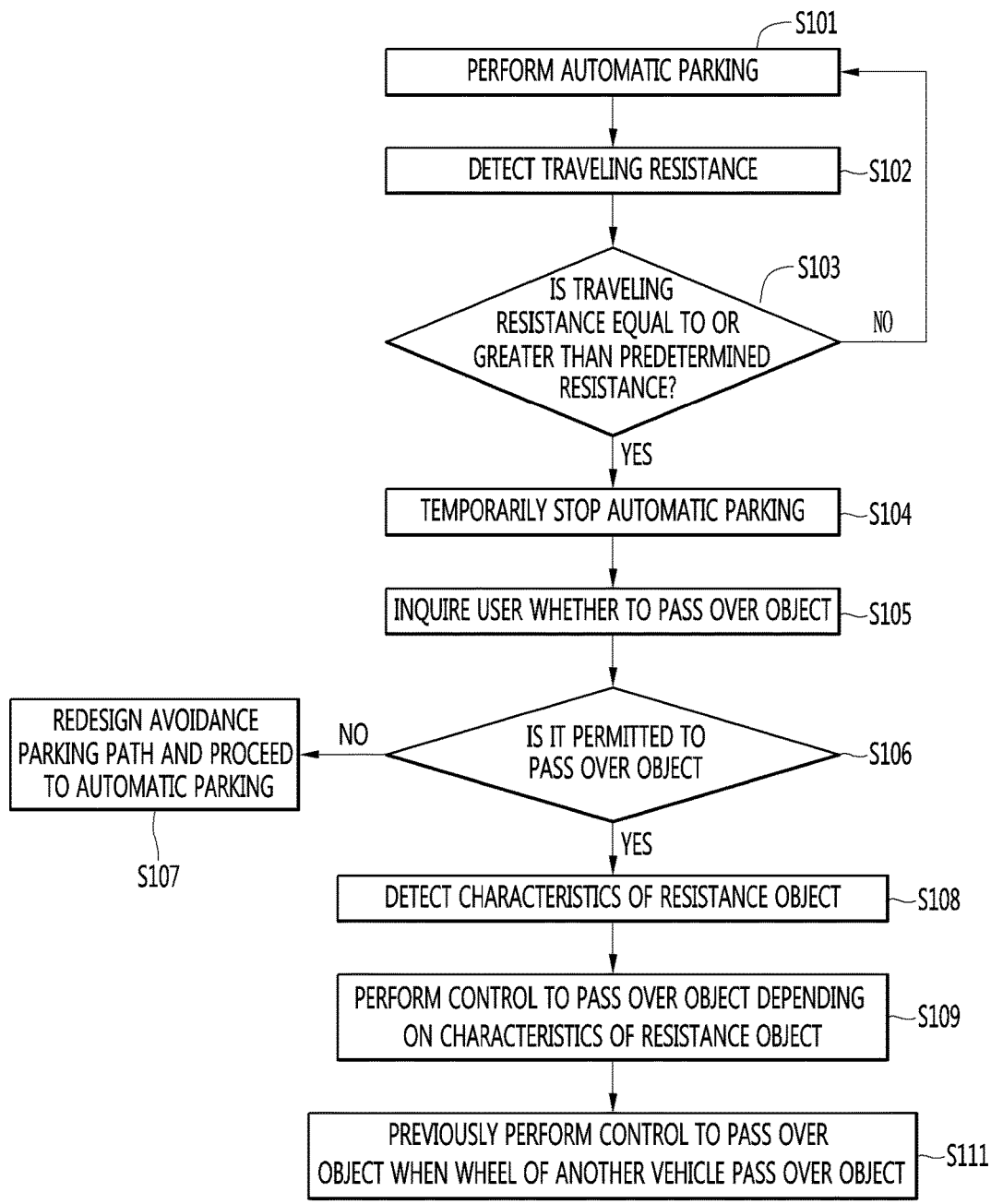
FIG. 8 is a flowchart of a method of providing an automatic parking function in response to traveling resistance according to a first embodiment of the present invention.

Next, a method of controlling the above-described configurations and providing an automatic parking function corresponding to the traveling resistance in the processor 170 will be described in detail below. Referring to FIG. 8, first, an automatic parking function is performed by a user (S101). Specifically, the input unit 110 can receive an input of performing the automatic parking function or/and an input of setting a target parking space from the user, and the processor 170 can perform the automatic parking function.

More specifically, the processor 170 can acquire information about a surrounding environment of the vehicle by controlling the sensor unit 155 and design a parking path for guiding the vehicle from a current position to a target parking position based on the information about the surrounding environment of the vehicle. The processor 170 can transmit a vehicle operation control signal to a vehicle driving unit through the interface unit 130 and perform control such that the vehicle follows the parking path and moves to the target parking position.

During the control of the traveling of the vehicle, the processor 170 can detect a traveling resistance (S102). Specifically, the processor 170 can analyze the sensor information received from the interface unit 130 and calculate a movement distance per an output of the vehicle. When the movement distance per an output of the vehicle decreases to a predetermined value or less, the processor 170 determines that there is the traveling resistance.

Also, the processor 170 can detect the traveling resistance based on a traveling speed per an output torque of the vehicle. Also, the processor 170 can detect the traveling resistance based on a movement distance per a unit time in the creeping mode. That is, the processor 170 can detect a traveling resistance when the traveling of the vehicle is interrupted because a wheel of the vehicle catches the object during traveling of the vehicle, based on vehicle traveling information acquired through the interface unit 130, the sensor unit 155, or the communication unit 120.

If the factor of the traveling resistance is caused by collision between the vehicle and the object, the processor 170 can perform control such that the vehicle stops urgently in order to minimize impact since an accident occurs. According to an embodiment, the factor of the traveling resistance can be limited to a factor lower than a predetermined height on a road of the vehicle or a factor when the vehicle traveling road is a slope.

Figure 9:
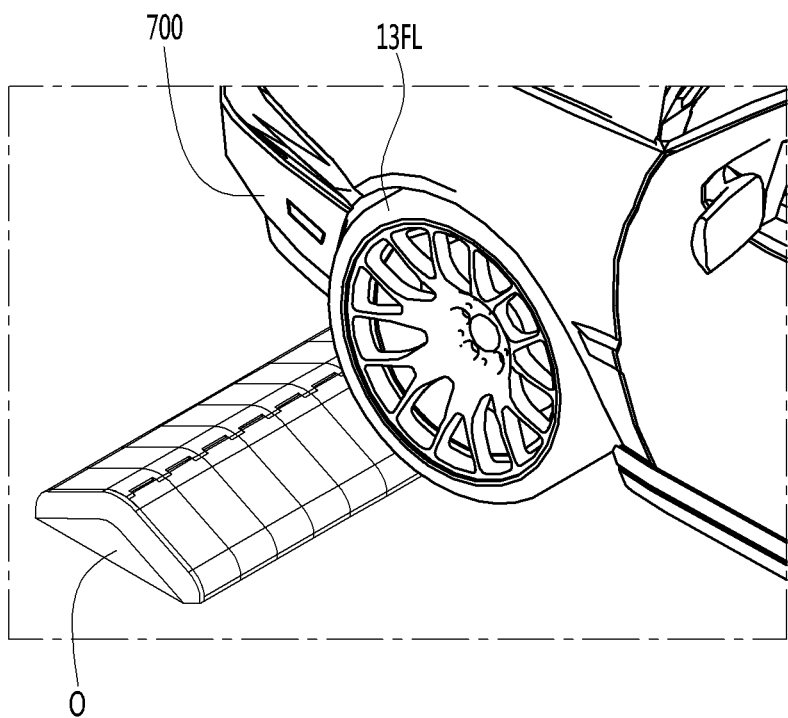
FIG. 9 is an example of a situation where traveling resistance occurs.

For example, referring to FIG. 9, when a wheel 13FL of the vehicle catches an object O, such as a speed bump, a speed of the vehicle may be instantaneously reduced. When such a traveling resistance occurs, the processor 170 can provide an automatic parking function corresponding to the traveling resistance. When the detected traveling resistance has a predetermined value or more, the processor 170 can perform the automatic parking function corresponding to the traveling resistance (S103).

Specifically, the processor 170 can calculate a value of the traveling resistance based on a movement distance per an output of the vehicle and, when a value of the traveling resistance is equal to or greater than the predetermined value, determine that the traveling resistance occurs. For example, when the movement distance per an output of the vehicle is equal to or less than a predetermined distance, the processor 170 can determine that the traveling resistance occurs and perform the automatic parking function, which copes with the traveling resistance.

Also, when a traveling speed per an output torque of the vehicle is equal to or less than a predetermined speed, the processor 170 can detect that the traveling resistance is detected and perform the automatic parking function, which copes with the traveling resistance. Also, when a speed of the vehicle in the creeping mode is equal to or less than a predetermined speed, the processor 170 can detect that the traveling resistance is detected and perform the automatic parking function, which copes with the traveling resistance.

Further, when the detected traveling resistance has a minus value, the processor 170 can perform the automatic parking function corresponding to the traveling resistance. For example, when the vehicle is instantaneously accelerated due to a slope or a groove on the road, the processor 170 can determine that a traveling resistance is detected and provide an automatic parking function.

When the traveling resistance has a predetermined resistance value or more, the processor 170 can control the vehicle to stop. (S104). Since the traveling resistance is caused by an object O that has not been discovered, the processor 170 controls the vehicle to stop until it is determined what is the object O that is causing the traveling resistance, achieving the safe automatic parking function.

After the stop of the vehicle, the processor 170 can inquire of a user whether to pass over the object that is causing the traveling resistance (S105). Specifically, the processor 170 can control the vehicle to stop when the traveling resistance is detected, and control the display unit 180 to display a graphic image inquiring of the user how to cope with the traveling resistance.

For example, when the vehicle stops, the processor 170 can inquire of the user whether to continuously perform the automatic parking function along an existing parking path.

In this instance, the display unit 180 can display an image obtained by photographing the object that is causing the traveling resistance, and further display a graphic image inquiring of the user whether to pass over the object.

Figure 10A:
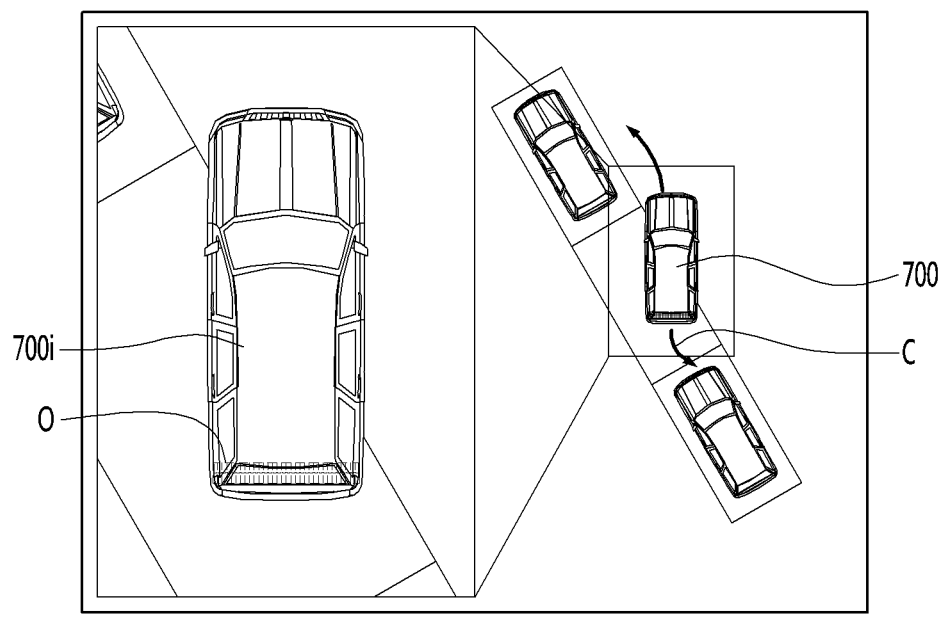
FIG. 10A is an example of a screen of a display unit when the traveling resistance occurs according to the first embodiment of the present invention.

When a vehicle surrounding image is displayed at a time point at which the traveling resistance occurs, the object O that is causing the traveling resistance is covered by the body of the vehicle and therefore, the user may not exactly grasp a factor of the traveling resistance. As shown in FIG. 10A, the traveling resistance is covered by the body of the vehicle or is out of a photography range in the vehicle surrounding image displayed by the display unit 180 at a time point at which the traveling resistance occurs, and therefore, the user cannot currently know the object of the traveling resistance from the vehicle surrounding image.

Figure 10B:
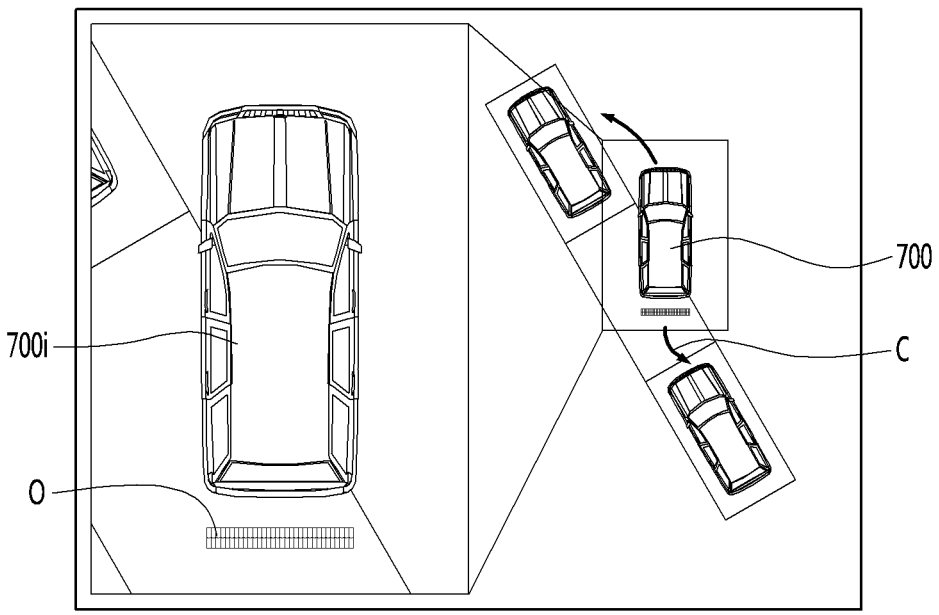
FIG. 10B is another example of a screen of a display unit when the traveling resistance occurs according to the first embodiment of the present invention.

Referring to FIG. 10B, since the object O that is causing the traveling resistance exists in the vehicle surrounding image on the screen of the display unit 180 displaying the vehicle surrounding image before occurrence of the traveling resistance, the user can exactly grasp the factor of the traveling resistance through the previous vehicle surrounding image.

Therefore, when the traveling resistance is detected, the display unit 180 according to the present embodiment displays the previous vehicle surrounding image generated by photographing, by the vehicle, the factor of the traveling resistance before the traveling resistance occurs, thus aiding the user in exactly grasping a factor of the traveling resistance.

Figure 10C:
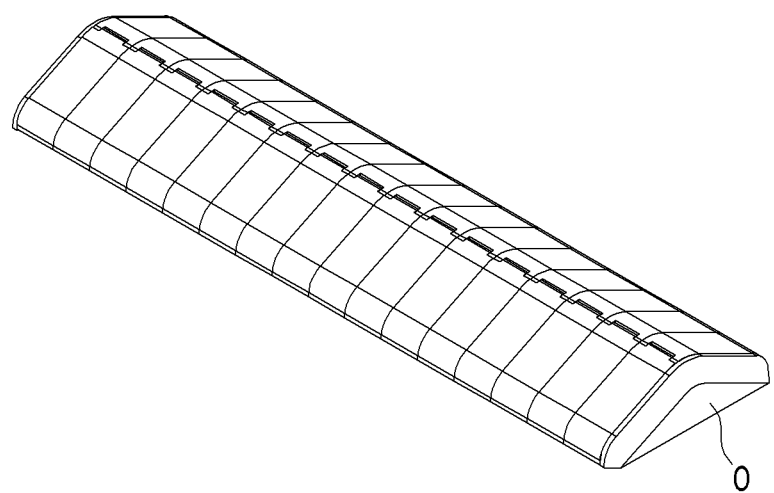
FIG. 10C is another example of a screen of a display unit when the traveling resistance occurs according to the first embodiment of the present invention.

Also, referring to FIG. 10C, when the traveling resistance is detected, the processor 170 can detect an object that causing the traveling resistance from the previous vehicle surrounding image and control the display unit 180 to display a vehicle surrounding image obtained at a time point at which the detected object O is well observed. For example, when the traveling resistance is detected during the reverse movement of the vehicle, the processor 170 can perform control such that an image previously photographed by a vehicle back-facing camera 160 is displayed. When the traveling resistance is detected during the forward movement of the vehicle, the processor 170 can perform control such that an image previously photographed by a vehicle front-facing camera 160 is displayed.

The controller 170 can receive a user input with respect to response to the traveling resistance, through the user input unit 110 (S106). When the processor 170 receives the user input of avoiding a factor of the traveling resistance through the input unit 110, the processor 170 can design a parking path for avoiding the factor of the traveling resistance and allow the vehicle to follow the redesigned parking path (S107).

Figure 11A:
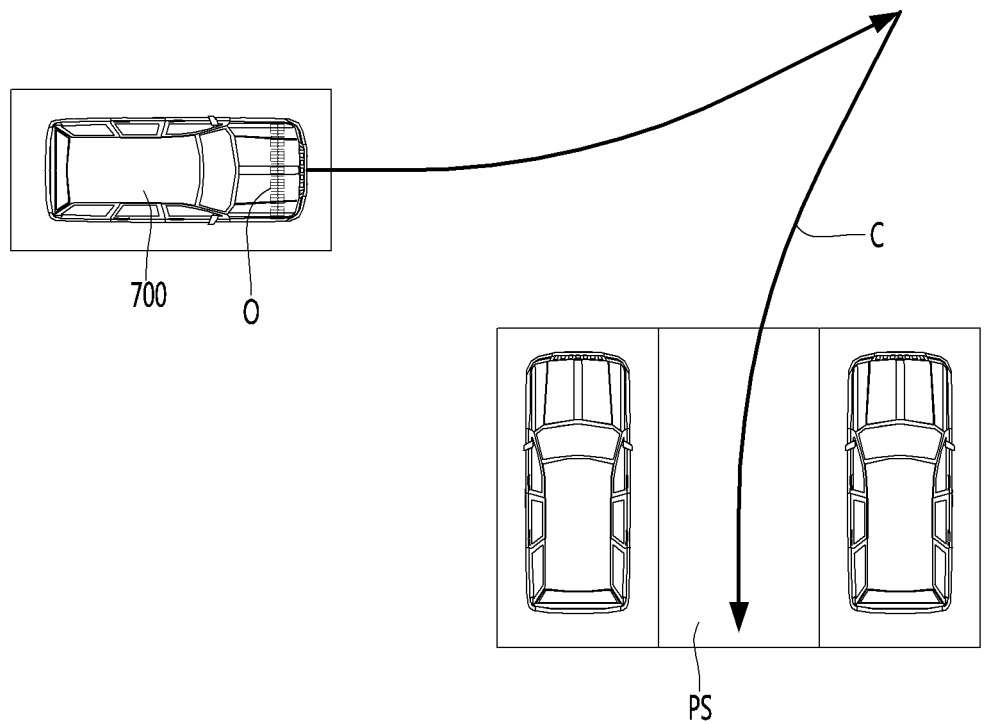
FIG. 11A illustrates a parking path before the traveling resistance occurs according to the first embodiment of the present invention.

Specifically, FIG. 11A shows that the vehicle is in a state in which the object O makes it hard for the vehicle to follow a parking path C, which is designed to guide the vehicle to a target parking position PS designed before the traveling resistance is detected.

Figure 11B:
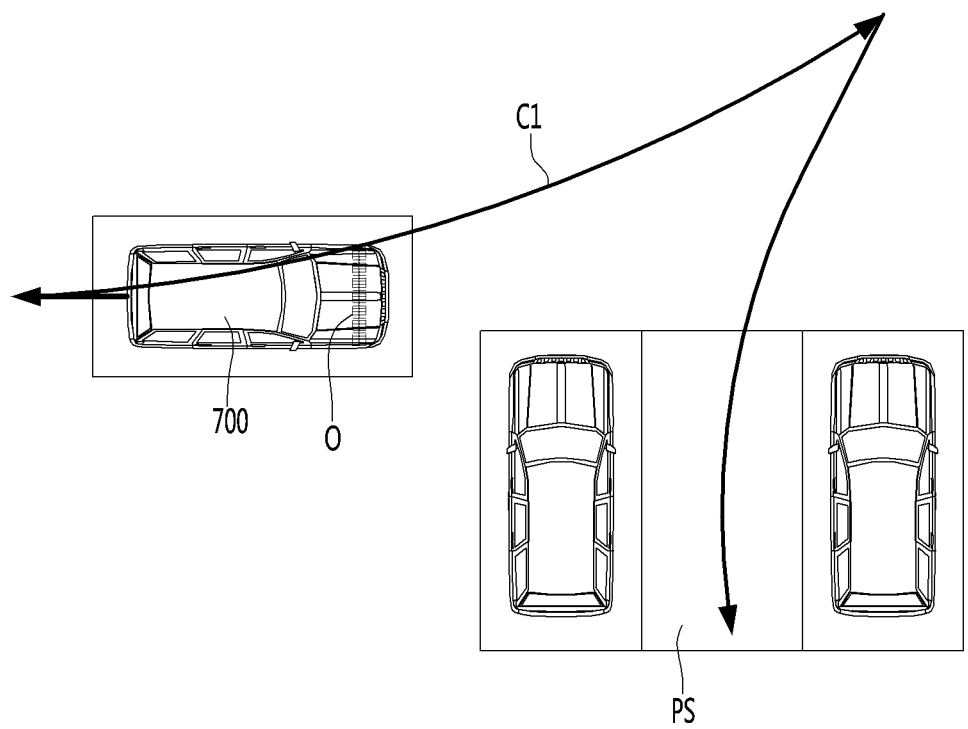
FIG. 11B illustrates a redesigned parking path after the traveling resistance occurs according to the first embodiment of the present invention.

Referring to FIG. 11B, when the user recognizes that the object O is difficult for the vehicle to pass over and inputs an instruction of parking the vehicle while avoiding the object O, the processor 170 can design a new parking path C1 avoiding the object O and guiding the vehicle to the target parking position PS and control the vehicle to follow the redesigned parking path C1. In this instance, the newly-designed parking path C1 may be a parking path C1 on which the vehicle does not pass over the object O.

When a user input of passing over the factor of the traveling resistance is received through the input unit 110, first, the processor 170 can scan characteristics of the object of the traveling resistance in detail (S108). Specifically, the processor 170 can sense the characteristics of the object O, for example, a type, a size, a height, a width, and the like, through the sensor unit 155.

Figure 12:
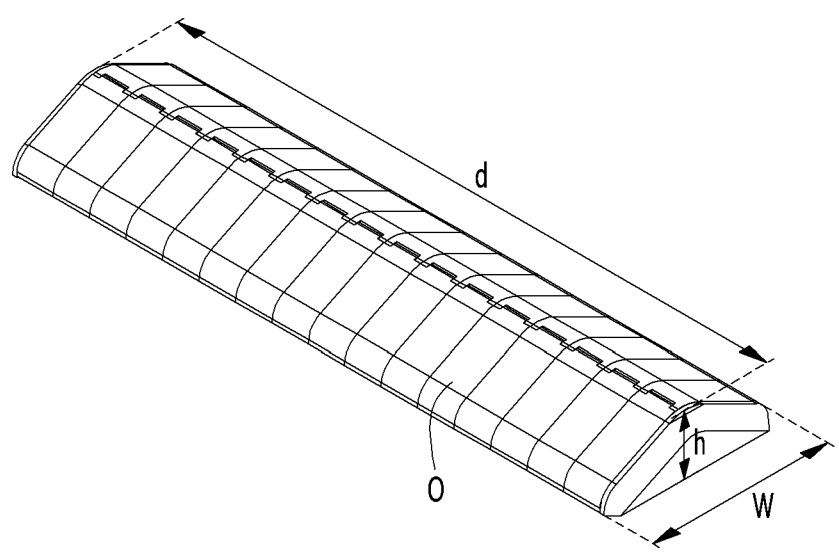
FIG. 12 illustrates characteristics of an object of the traveling resistance according to the first embodiment of the present invention.

For example, referring to FIG. 12, a width W of the object O, a length d of the object O, a height h of the object, and the like may be measured by the sensor unit 155, as the characteristics of the object O. When the characteristics of the object O are detected as described above, the processor 170 can control the vehicle to pass over the object based on the characteristics of the object O.

Specifically, the processor 170 can calculate a correction output value for passing over a factor of the traveling resistance based on the characteristics of the factor of the traveling resistance and control the vehicle to pass over the factor of the traveling resistance by controlling the power unit of the vehicle according to the correction output value.

That is, the processor 170 can calculate an additional output value for vehicle movement in order to pass over the traveling resistance and control the power unit of the vehicle to further generate the additional output value, thus allowing the vehicle to pass over the object O. In an embodiment, the processor 170 controls the traveling of the vehicle in a creeping mode in which a basic torque is consistently provided to the vehicle, thus achieving the safe automatic parking function. The creeping mode refers to a mode in which the vehicle moves forward by a torque basically provided by the power unit of the vehicle in a state in which there is no acceleration pedal operation, without additional power due to an operation by an accelerator pedal of the vehicle.

That is, the processor 170 can perform automatic parking of the vehicle by controlling the steering or break of the vehicle without separately controlling the power of the vehicle, in the state in which a basic output torque is consistently provided. Therefore, the processor 170 can control the vehicle to pass over the factor of the traveling resistance by changing the basic torque of the creeping mode to output the correction output value in the creeping mode.

For example, the processor 170 can change the basic torque value provided in the creeping mode by at least two levels. The processor 170 calculates a torque level for providing power corresponding to the correction output value for passing over the object O and changes the torque value of the creeping mode to the calculated torque level to control the output of the vehicle. When the correction output value is hardly achieved only by the change in the torque of the creeping mode, the power unit of the vehicle may be controlled so as to output the correction output value by controlling the output of the vehicle through the accelerator pedal of the vehicle.

When the traveling resistance is detected at a front wheel of the vehicle, after the front wheel has passed over the factor of the traveling resistance, the processor 170 changes the torque of the creeping mode back to the basic torque and then allows the vehicle to travel.

The processor 170 can change the basic torque of the creeping mode to output the correction output value in the creeping mode before a back wheel of the vehicle passes over the factor of the traveling resistance, to control the vehicle to pass over the factor of the traveling resistance. When the traveling resistance is detected at a front wheel of the vehicle, it is expected that the traveling resistance is also detected at a back wheel of the vehicle.

In this instance, repeatedly performing a process of coping with the traveling resistance may cause user inconvenience. Therefore, the parking assistance apparatus 100 can use the method of controlling the power unit which is performed with respect to the front wheel of the vehicle when the back wheel of the vehicle passes over the object O, thus performing control such that the back wheel of the vehicle passes over the object O.

Figure 13:
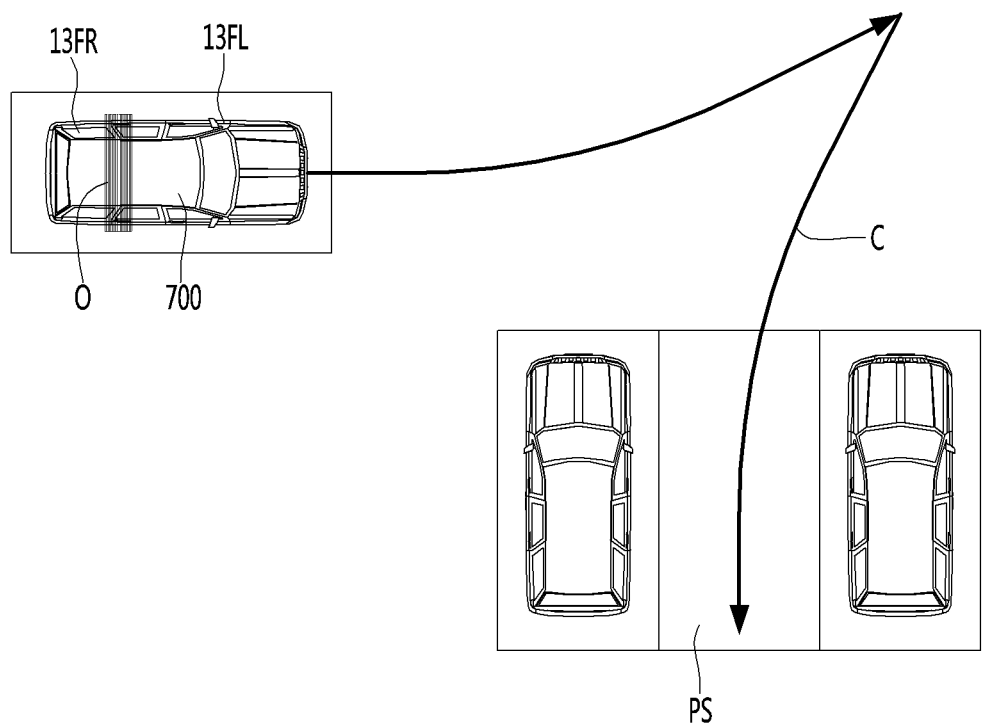
FIG. 13 illustrates a state where a vehicle passes over the object of the traveling resistance according to the first embodiment of the present invention.
Figure 14:
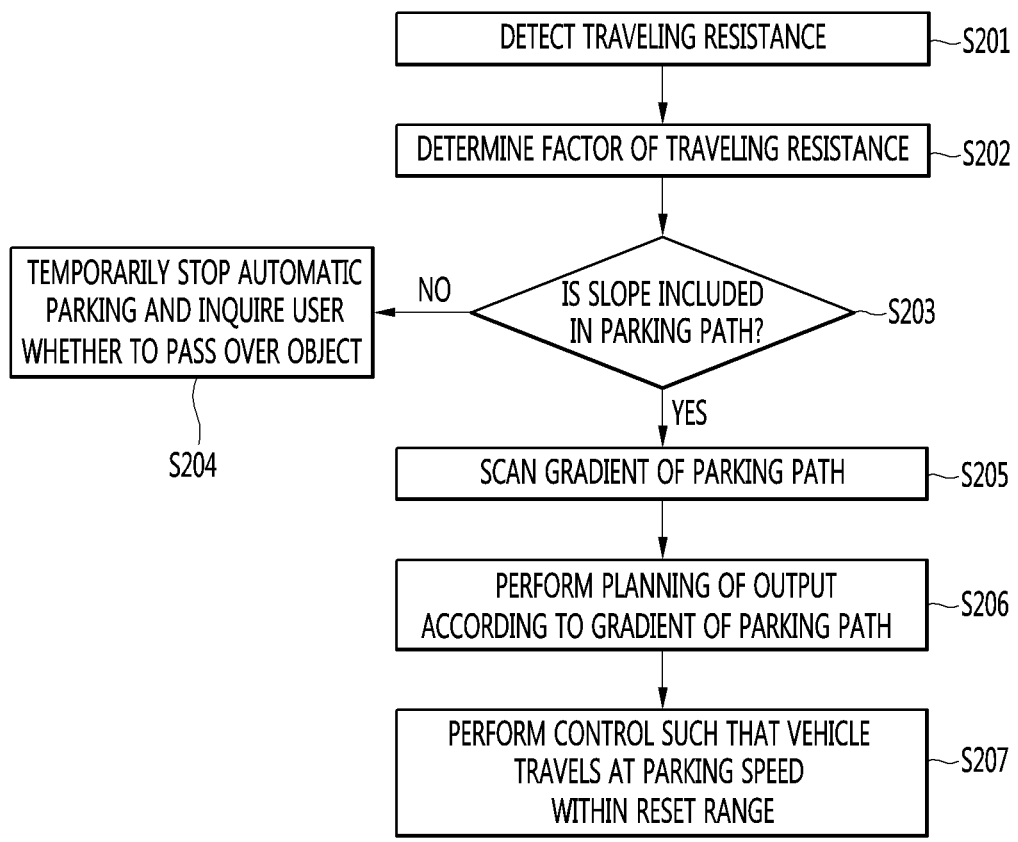
FIG. 14 is a flowchart of a method of providing an automatic parking function in response to traveling resistance, according to a second embodiment of the present invention.
Figure 15:
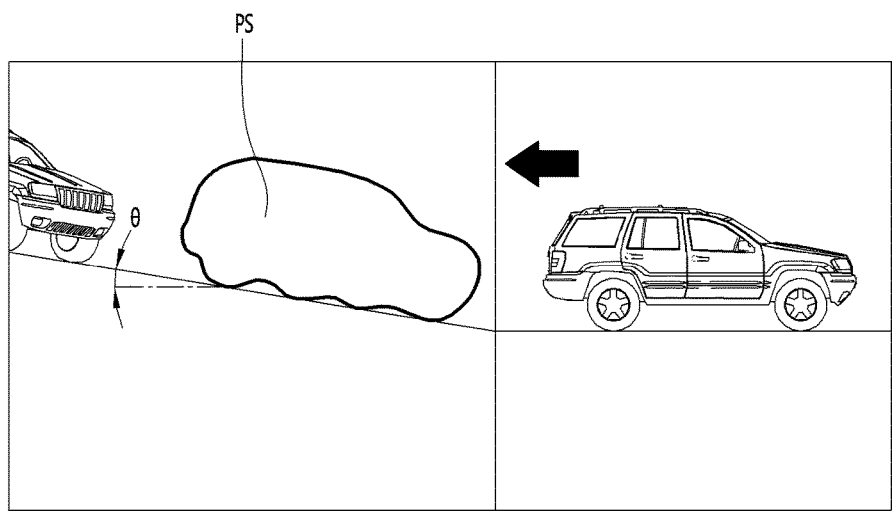
FIG. 15 illustrates a situation where traveling resistance occurs in a slope.

Referring to FIG. 13, when the processor 170 detects the traveling resistance at the front wheel 13FL of the vehicle, receives a user input of passing over the traveling resistance, and control the traveling of the vehicle such that the front wheel 13FL of the vehicle passes over the object O, the processor 170 can control the traveling of the vehicle such that the back wheel FR of the vehicle passes over the object O without inquiring of the user whether to pass over the traveling resistance or without separately scanning the object O, before the traveling resistance is detected at the back wheel FR of the vehicle.

Further, when the traveling resistance is detected at the back wheel FR of the vehicle, after the back wheel has passed over the factor of the traveling resistance, the processor 170 changes the torque of the creeping mode back to the basic torque and then allows the vehicle to travel. The processor 170 can change the basic torque of the creeping mode to output the correction output value in the creeping mode before the front wheel 13FL of the vehicle passes over the factor of the traveling resistance, to control the vehicle to pass over the factor of the traveling resistance.

That is, when a traveling resistance is detected at the back wheel FR, the parking assistance apparatus 100 predicts that a traveling resistance is also detected at the front wheel 13FL, and uses the method which is performed with respect to the back wheel FR when the front wheel 13FL passes over the object O, thus performing control such that the front wheel 13FL passes over the object O.

As described above, when the traveling resistance is detected during control of the traveling of the vehicle, the parking assistance apparatus 100 can exactly display occurrence of the traveling resistance to the user and when receiving a user input of passing over the object O, control the vehicle to safely pass over the object O by appropriately controlling a torque. Also, when the back wheel FR passes through the object after the front wheel 13FL has passed over the object O, the parking assistance apparatus 100 can control the vehicle to safely pass over the object O without inquiring of the user, thus enhancing user convenience.

A method of providing an automatic parking function on a slope in the parking assistance apparatus 100 will be described below in detail. The processor 170 can detect a traveling resistance and determine that the traveling resistance is caused due to traveling of the vehicle on the slope. (S201 and S202). Specifically, the processor 170 can analyze a gradient of the vehicle based on sensor information and, when the gradient of the vehicle is equal to or greater than a predetermined angle, detect that there is the traveling resistance due to the slope.

Further, when it is continuously detected that a movement distance per an output of the vehicle is equal to or less than a predetermined distance, the processor 170 can detect that the traveling resistance is detected due to the slope and perform the automatic parking function, which copes with the traveling resistance. Also, when the vehicle travels for a predetermined time or more in a state in which a traveling speed per an output torque of the vehicle is equal to or less than a predetermined speed, the processor 170 can detect that the traveling resistance is detected due to the slope and perform the automatic parking function, which copes with the traveling resistance.

In addition, when the vehicle travels for a predetermined time or more in a state in which a vehicle speed is equal to or less than a predetermined speed in the creeping mode, the processor 170 can detect that the traveling resistance is detected due to the slope and perform the automatic parking function, which copes with the traveling resistance. When the traveling resistance is not caused by the slope, the processor 170 can temporarily stop the automatic parking function and control the display unit 180 to display a graphic image inquiring of a user how to cope with the traveling resistance (S204).

When the traveling resistance is caused by the traveling on the slope, the processor 170 can detect a gradient of the parking path C (S205). The processor 170 can correct an output of the vehicle according to a gradient of the parking path and perform control such that the vehicle travels on the slope within a predetermined speed range (S206 and S207).

That is, the processor 170 can obtain the gradient of the slope and calculate a correction output value for controlling the vehicle to travel on the slope within the predetermined speed range, based on the gradient. The processor 170 can control traveling of the vehicle in the creeping mode in which a basic torque is consistently provided to the vehicle, change the basic torque of the creeping mode to output a correction output value in the creeping mode, and control a speed of the vehicle within the predetermined speed range.

For example, the processor 170 can change the basic torque of the vehicle according to the gradient of the slope at a current position of the vehicle, again correct the changed torque of the vehicle as the gradient varies with movement of the vehicle, and control the speed of the vehicle on the slope within the predetermined speed range. Also, the processor 170 can design a parking path for guiding the vehicle to the target parking position PS, obtain a gradient of the parking path, and determine an output torque of the vehicle with respect to each of sections constituting the parking path.

Figure 16:
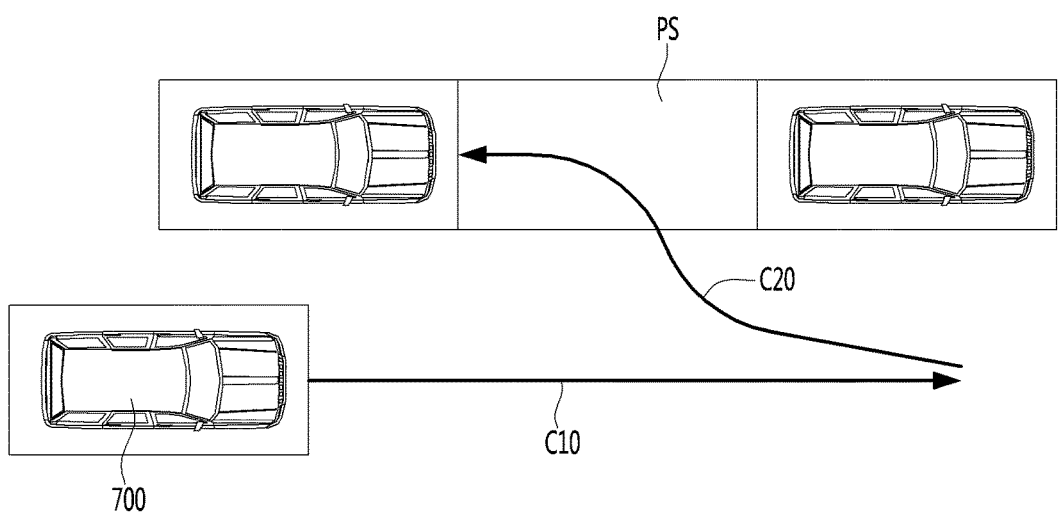
FIG. 16 illustrates a parking path in a slope according to a second embodiment of the present invention.

Specifically, referring to FIG. 16, the processor 170 can sense a vehicle surrounding environment by controlling the sensor unit 155, design a parking path C10 and C20 based on the vehicle surrounding environment, and scan a gradient with respect to each of sections constituting the parking path C10 and C20.

Figure 17:
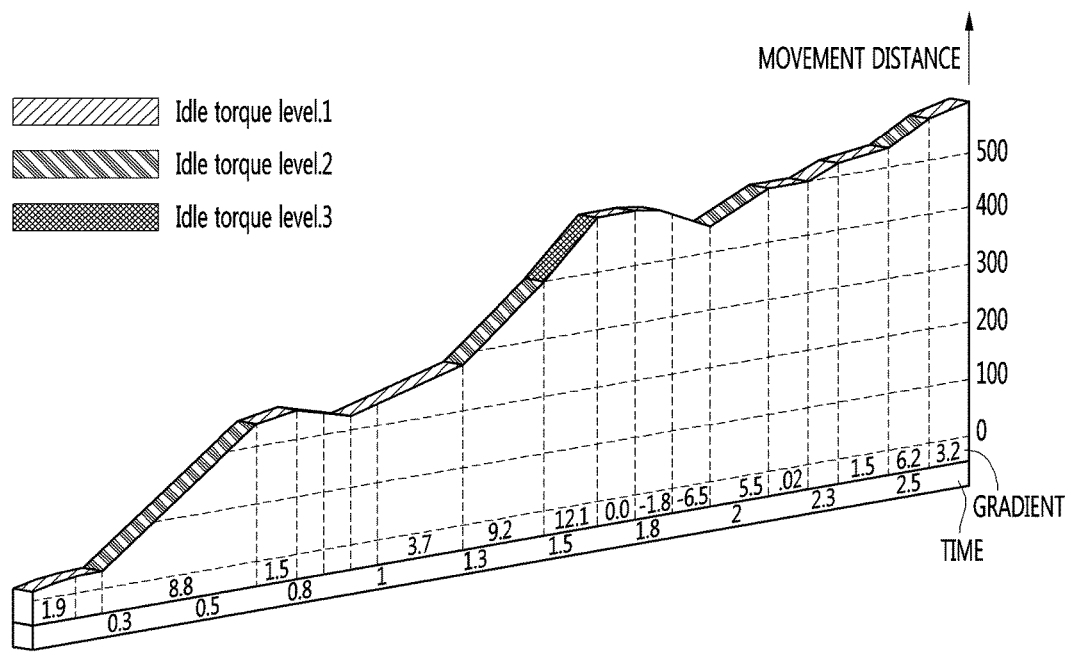
FIG. 17 is a graph in which output torque values are set to respective sections of a parking path.

Next, referring to FIG. 17, the processor 170 can perform planning of a torque level of the vehicle with respect to each of sections constituting the parking path C10 and C20 and control the vehicle to travel on the parking path C10 and C20 of the vehicle with the planned torque level, thus controlling the speed of the vehicle within the predetermined speed range. That is, the processor 170 can control a speed of the vehicle when the vehicle travels up the slope and a speed of the vehicle when the vehicle travels down the slope within the predetermined speed range.

Therefore, the parking assistance apparatus 100 controls the vehicle to travel within the predetermined speed range even in the environment in which the parking path C10 and C20 includes a slope, achieving automatic paring of the vehicle safely. In this instance, the display unit 180 may display the parking path C10 and C20 of the vehicle, the gradient of each section of the parking path C10 and C20, informing the user that the vehicle is automatically and safely parked on the slope.

Figure 18:
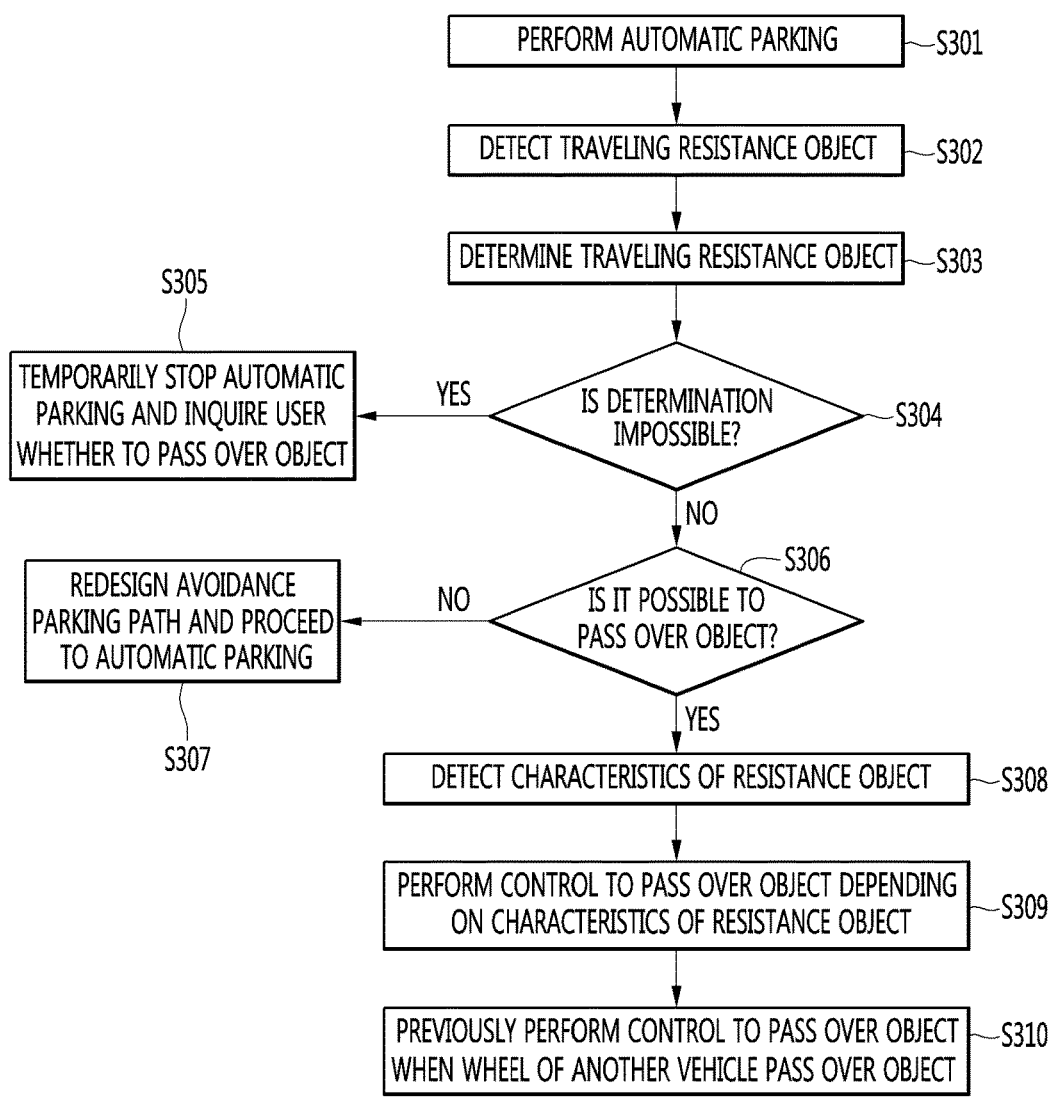
FIG. 18 is a flowchart of a method of providing an automatic parking function in response to traveling resistance according to a third embodiment of the present invention.

A method of providing an automatic parking function corresponding to the traveling resistance, according to another embodiment will be described in detail below. Referring to FIG. 18, first, the automatic parking function may be performed by a user (S301). Specifically, the input unit 110 can receive an input of performing the automatic parking function or/and an input of setting a target parking space from the user, and the processor 170 can perform the automatic parking function.

More specifically, the processor 170 can control sensor unit 155 to acquire information about a surrounding environment of the vehicle and design a parking path C for guiding the vehicle from a current position to a target parking position PS based on the information about the surrounding environment of the vehicle. The processor 170 can transmit a vehicle operation control signal to a vehicle driving unit through the interface unit 130 and perform control such that the vehicle follows the parking path and moves to the target parking position PS.

During the control of the traveling of the vehicle, the processor 170 can detect an object of a traveling resistance (S302). Specifically, the processor 170 can analyze the sensor information received from the interface unit 130 and calculate the movement distance per an output of the vehicle. When the movement distance per an output of the vehicle decreases to a predetermined value or less, the processor 170 determines that there is the traveling resistance.

That is, the processor 170 can detect the traveling resistance, which occurs when the traveling of the vehicle is interrupted because a wheel of the vehicle catches the object O during traveling of the vehicle, based on vehicle traveling information acquired through the interface unit 130, the sensor unit 155, or the communication unit 120.

In addition, the processor 170 can previously detect a factor of the traveling resistance from a vehicle surrounding image photographed by the camera 160. Specifically, the processor 170 can perform image analysis on the image by photographing a road around the vehicle and when an object of the traveling resistance having a size equal to or greater than a predetermined size, perform the automatic parking function corresponding to the object O of the traveling resistance.

When the object O of the traveling resistance is detected, the processor 170 can determine characteristics of the object O by scanning the object O of the traveling resistance (S303). Specifically, when a factor of the traveling resistance is detected from an image photographed by the camera 160, the processor 170 can determine the factor of the traveling resistance and provide the automatic parking function corresponding to the factor of the traveling resistance. For example, the processor 170 can perform image deep learning based on the image related with the factor of the traveling resistance and determine a type of the factor of the traveling resistance.

Figure 19A:
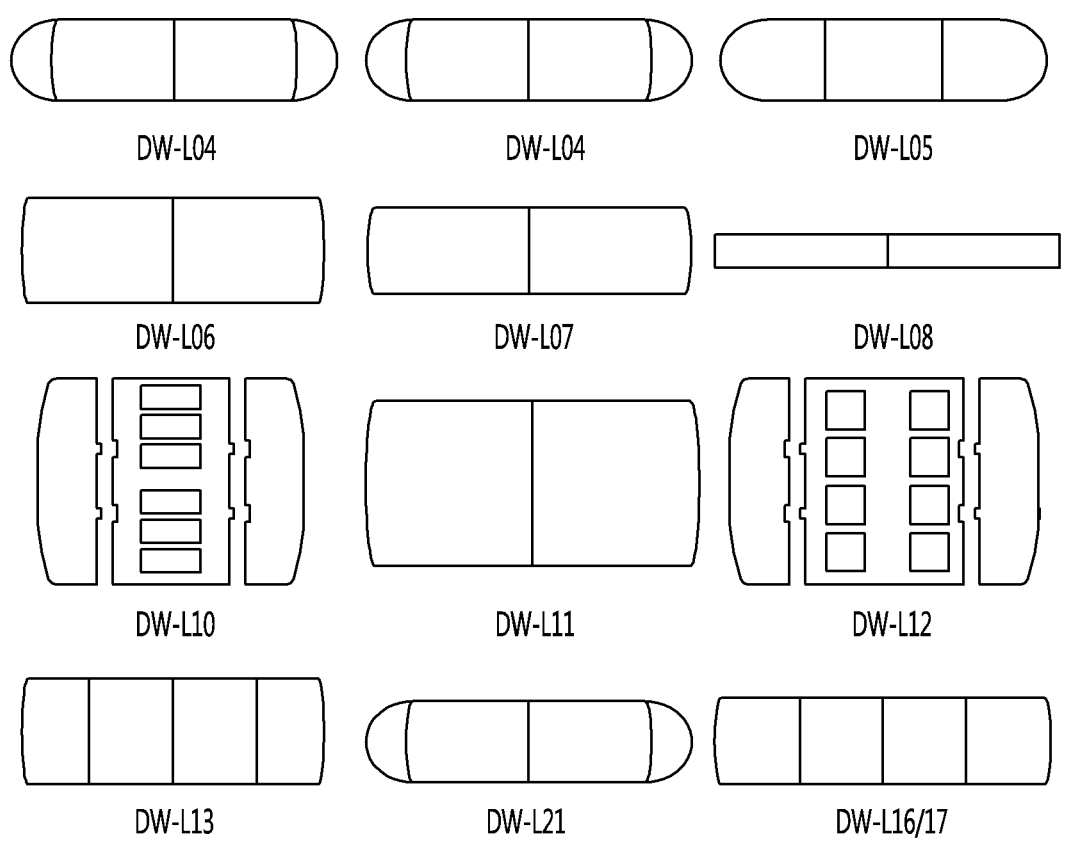
FIGS. 19A and 19B illustrate images stored in a memory so as to determine a type of a factor of traveling resistance through image deep learning.
Figure 19B:
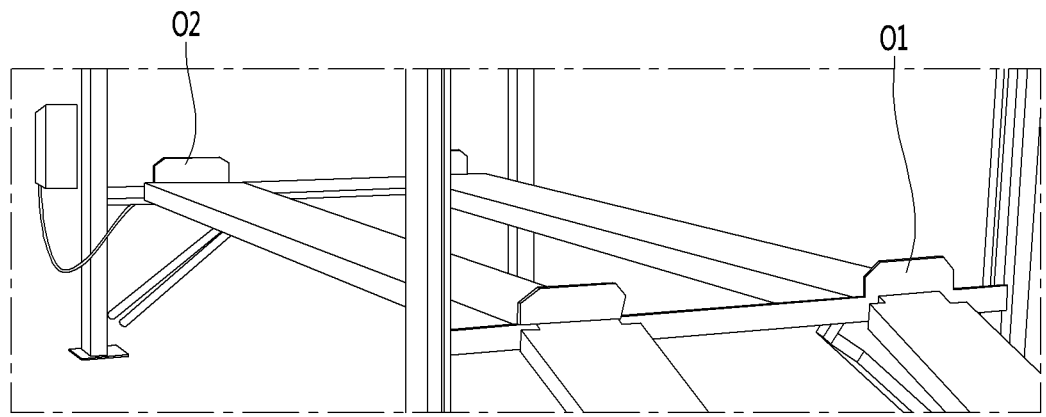
Figure 20:
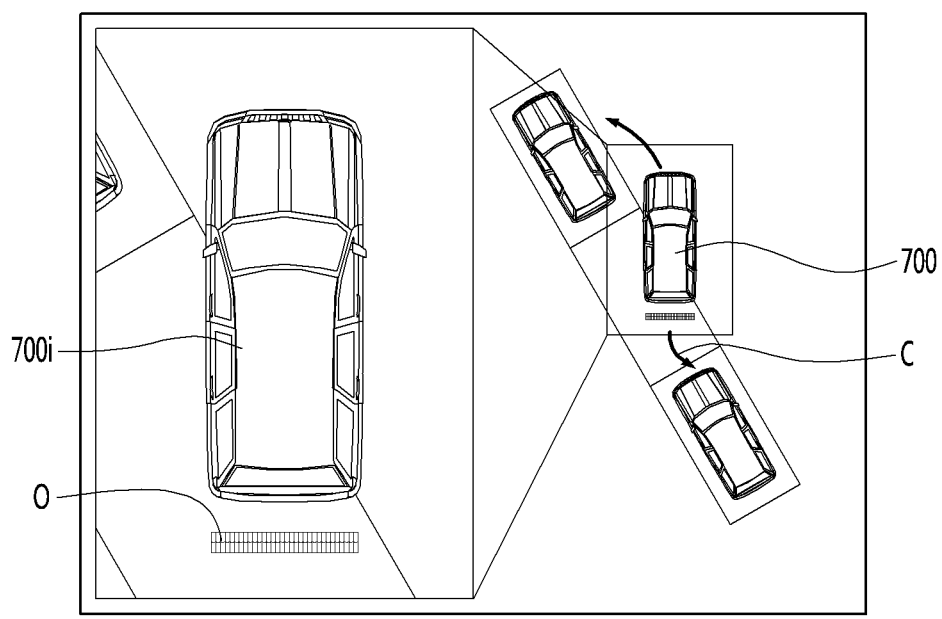
FIG. 20 is an example of a screen of a display unit when traveling resistance occurs according to a third embodiment of the present invention.
Figure 21:
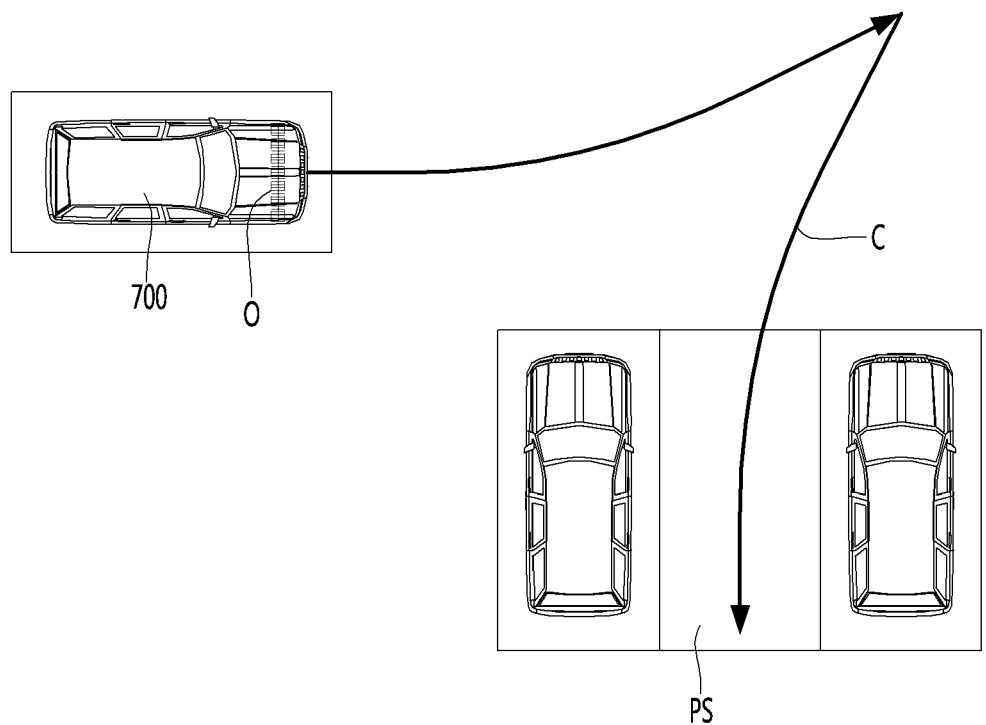
FIG. 21 illustrates a redesigned parking path after the traveling resistance occurs according to the third embodiment of the present invention.

Referring to FIG. 19A, the memory can store various images related with a speed bump, and the processor 170 performs image deep learning with respect to the object O extracted from the photographed image, and when a resulted image matches the image stored in the memory, determines that the object O is the speed bump. Referring to FIG. 19B, the memory stores an image related with a vehicle elevator, and the processor 170 performs image deep learning with respect to the object O extracted from the photographed image, and when a resulted image matches the image stored in the memory, determines that the object O is the vehicle elevator.

In addition, the processor 170 can determine a type of an object causing the traveling resistance when the object O is detected (S304). When it is hard to identify the object O (YES in S305), it is possible to stop the traveling of the vehicle before the vehicle passes over the object O and inquire of the user whether to pass over the object O (S305).

Specifically, the processor 170 can control the vehicle to stop when the traveling resistance is detected, and control the display unit 180 to display a graphic image inquiring of the user how to cope with the traveling resistance. For example, when the vehicle stops, the processor 170 can inquire of the user whether to continuously perform the automatic parking function along an existing parking path.

In this instance, the display unit 180 may display an image obtained by photographing the object that is causing the traveling resistance, and further display a graphic image inquiring of the user whether to pass over the object.

Referring to FIG. 10B, since the object O that is causing the traveling resistance exists in the vehicle surrounding image on the screen of the display unit 180 displaying the vehicle surrounding image before occurrence of the traveling resistance, the user can exactly grasp the factor of the traveling resistance through the previous vehicle surrounding image.

Therefore, when the traveling resistance is detected, the display unit 180 according to the present embodiment displays the previous vehicle surrounding image generated by photographing, by the vehicle, the factor of the traveling resistance before the traveling resistance occurs, thus aiding the user in exactly grasping a factor of the traveling resistance.

When a type of the object O causing the traveling resistance is determined (NO in S304), the processor 170 determines whether the vehicle can pass over the object O (S306). That is, the parking assistance apparatus 100 can identify an object over which the vehicle can pass and an object over which the vehicle cannot pass and perform another automatic parking function depending on whether the vehicle can pass over the object based on the type of the object (NO in S306). When the traveling resistance factor is the object over which the vehicle cannot pass, the processor 170 designs a parking path C avoiding a traveling resistance factor (S307).

Referring to FIG. 11B, when the user recognizes that the object O is difficult for the vehicle to pass over and inputs an instruction of parking the vehicle while avoiding the object O, the processor 170 can design a new parking path C1 avoiding the object O and guiding the vehicle to the target parking position PS and control the vehicle to follow the redesigned parking path C1. In this instance, the newly-designed parking path C1 may be a parking path C1 on which the vehicle does not pass over the object O.

In addition, when the factor of the traveling resistance is an object which the vehicle can pass over (YES in S306), the object O of the traveling resistance, the processor 170 can calculate a correction output value for passing over a factor of the traveling resistance and control the vehicle to pass over the factor of the traveling resistance by controlling the power unit of the vehicle according to the correction output value (S308, S309 and S310).

In particular, when the vehicle is capable of passing over the object O of the traveling resistance, first, the processor 170 can scan characteristics of the object of the traveling resistance in detail (S308). For example, the processor 170 can sense the characteristics of the object O, for example, a type, a size, a height, a width, and the like, through the sensor unit 155.

Figure 22:
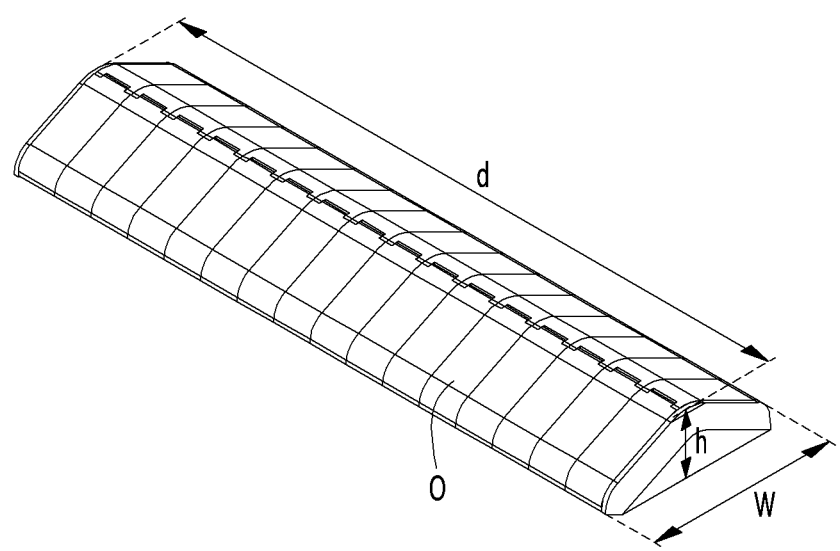
FIG. 22 illustrates characteristics of an object of the traveling resistance according to the third embodiment of the present invention.

Referring to FIG. 22, a width of the object O, a length of the object O, a height of the object, and the like can be measured by the sensor unit 155, as the characteristics of the object O. When the characteristics of the object O are detected as described above, the processor 170 can control the vehicle to pass over the object based on the characteristics of the object O (S309).

Specifically, the processor 170 can calculate a correction output value for passing over a factor of the traveling resistance based on the characteristics of the factor of the traveling resistance and control the vehicle to pass over the factor of the traveling resistance by controlling the power unit of the vehicle according to the correction output value. That is, the processor 170 can calculate an additional output value for vehicle movement in order to pass over the traveling resistance and control the power unit of the vehicle to further generate the additional output value, thus allowing the vehicle to pass over the object O.

In an embodiment, the processor 170 controls the traveling of the vehicle in a creeping mode in which a basic torque is consistently provided to the vehicle, thus achieving the safe automatic parking function. The creeping mode refers to a mode in which the vehicle moves forward by a torque basically provided by the power unit of the vehicle in a state in which there is no acceleration pedal operation, without additional power due to an operation by an accelerator pedal of the vehicle.

That is, the processor 170 can perform automatic parking of the vehicle by controlling the steering or break of the vehicle without separately controlling the power of the vehicle, in the state in which a basic output torque is consistently provided. Therefore, the processor 170 can control the vehicle to pass over the factor of the traveling resistance by changing the basic torque of the creeping mode to output the correction output value in the creeping mode.

For example, the processor 170 can change the basic torque value provided in the creeping mode by at least two levels. The processor 170 calculates a torque level for providing power corresponding to the correction output value for passing over the object O and changes the torque value of the creeping mode to the calculated torque level to control the output of the vehicle. When the correction output value is hardly achieved only by the change in the torque of the creeping mode, the power unit of the vehicle may be controlled so as to output the correction output value by controlling the output of the vehicle through the accelerator pedal of the vehicle.

When the traveling resistance is detected at the front wheel 13FL of the vehicle, after the front wheel 13FL has passed over the factor of the traveling resistance, the processor 170 changes the torque of the creeping mode back to the basic torque and then allows the vehicle to travel (S310). The processor 170 can change the basic torque of the creeping mode to output the correction output value in the creeping mode before the back wheel FR of the vehicle passes over the factor of the traveling resistance, to control the vehicle to pass over the factor of the traveling resistance.

When the traveling resistance is detected at the front wheel 13FL of the vehicle, it is expected that the traveling resistance is also detected at the back wheel FR of the vehicle. In this instance, repeatedly performing a process of coping with the traveling resistance may cause user inconvenience. Therefore, the parking assistance apparatus 100 can use the method of controlling the power unit which is performed with respect to the front wheel 13FL of the vehicle when the back wheel FR of the vehicle passes over the object O, thus performing control such that the back wheel FR of the vehicle passes over the object O.

Figure 23:
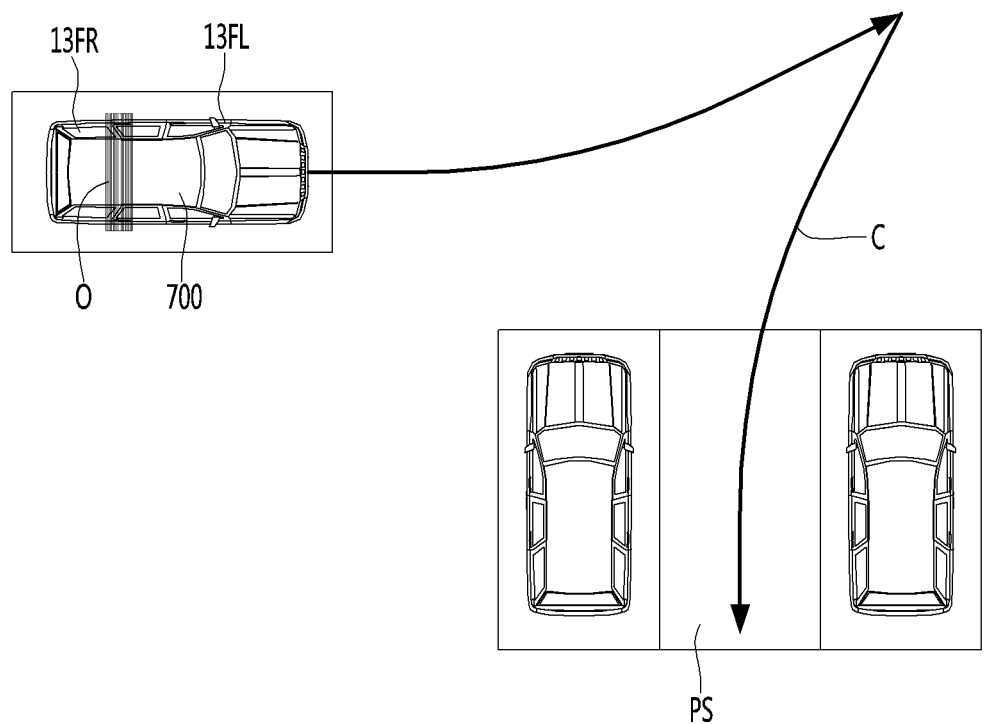
FIG. 23 illustrates a situation where a vehicle passes over an object of traveling resistance according to a third embodiment of the present invention.

Referring to FIG. 23, when the processor 170 detects the traveling resistance at the front wheel 13FL of the vehicle, receives a user input of passing over the traveling resistance, and controls the traveling of the vehicle such that the front wheel 13FL of the vehicle passes over the object O, the processor 170 can control the traveling of the vehicle such that the back wheel FR of the vehicle passes over the object O without inquiring of the user whether to pass over the traveling resistance or without separately scanning the object O, before the traveling resistance is detected at the back wheel FR of the vehicle.

Further, when the traveling resistance is detected at the back wheel FR of the vehicle, after the back wheel has passed over the factor of the traveling resistance, the processor 170 changes the torque of the creeping mode back to the basic torque and then allows the vehicle to travel. The processor 170 can change the basic torque of the creeping mode to output the correction output value in the creeping mode before the front wheel 13FL of the vehicle passes over the factor of the traveling resistance, to control the vehicle to pass over the factor of the traveling resistance.

That is, when a traveling resistance is detected at the back wheel FR, the parking assistance apparatus 100 predicts that a traveling resistance is also detected at the front wheel 13FL, and uses the method which is performed with respect to the back wheel FR when the front wheel 13FL passes over the object O, thus performing control such that the front wheel 13FL passes over the object O.

As described above, when the traveling resistance is detected during control of the traveling of the vehicle, the parking assistance apparatus 100 can exactly display occurrence of the traveling resistance to the user and determine whether the vehicle is capable of passing over the object O, enhancing user convenience. Further, when the vehicle is capable of passing over the object O, it is possible to perform control such that the vehicle safely passes over the object by appropriately controlling the torque.

Also, when the back wheel FR passes through the object after the front wheel 13FL has passed over the object O, the parking assistance apparatus 100 can control the vehicle to safely pass over the object O without inquiring of the user, thus enhancing user convenience.

Figure 24:
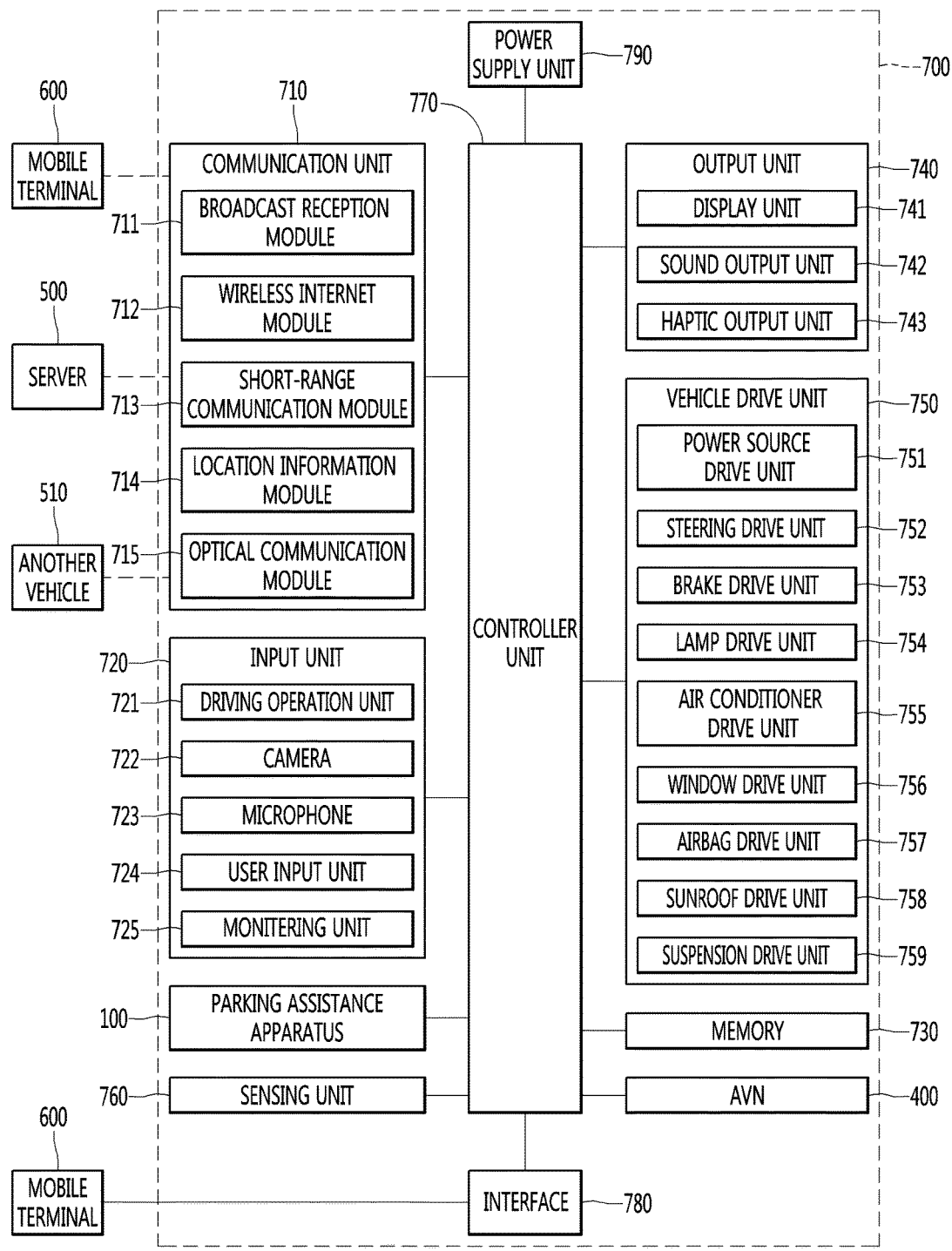
FIG. 24 is a block diagram showing the internal configuration of the vehicle having the parking assistance apparatus shown in FIG. 1.

Referring to the FIG. 24, the above-described parking assistance apparatus 100 can be included in the vehicle 700. The vehicle 700 may include a communication unit 710, an input unit 720, a sensing unit 760, an output unit 740, a vehicle drive unit 750, a memory 730, an interface 780, a controller 770, a power supply unit 790, a parking assistance apparatus 100 and AVN apparatus 400. Here, among the units included in the parking assistance apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 50 or between the vehicle and the other vehicle 510. Further, the communication unit 710 may include one or more modules which connect the vehicle to one or more networks. The communication unit 710 includes a broadcast receiving module 711, a wireless Internet module 712, a short-range communication module 713, and an optical communication module 715.

The broadcast reception module 711 receives a broadcast signal or broadcast related information from an external broadcast management server through a broadcast channel. Here, the broadcast includes a radio broadcast or a TV broadcast. The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 500. The wireless Internet module 712 can receive weather information and road traffic state information (e.g., transport protocol experts group (TPEG) information) from the external server 500.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600. The short-range communication module 713 can receive weather information and road traffic state information (e.g., transport protocol experts group (TPEG) information) from the mobile terminal 600. When a user rides in the vehicle, the mobile terminal 600 of the user and the vehicle may pair with each other automatically or by executing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module. The optical communication module 715 may include a light emitting unit and a light reception unit.

The light reception unit may convert a light signal into an electric signal and receive information. The light reception unit may include a photodiode (PD) for receiving light. The photodiode may covert light into an electric signal. For example, the light reception unit can receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 510 via optical communication.

The input unit 720 may include a driving operation unit 721, a camera 195, a microphone 723 and a user input unit 724. The driving operation unit 721 receives user input for driving of the vehicle (see FIG. 7). The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel using rotation. In some embodiments, the steering input unit 721A may be configured as a touchscreen, a touch pad, or a button. The shift input unit 721D is configured to receive input for selecting one of Park (P), Drive (D), Neutral (N), and Reverse (R) gears of the vehicle from the user. The shift input unit 721D may have a lever form. In some embodiments, the shift input unit 721D may be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some embodiments, the acceleration input unit 721C or the brake input unit 721B may be configured as a touchscreen, a touch pad, or a button.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit 725 for capturing the image of the space inside the vehicle.

The monitoring unit 725 may acquire an image of a passenger. The monitoring unit 725 may acquire an image for biometric information of the passenger. Although the monitoring unit 725 and the camera 722 are included in the input unit 720 in FIG. 24, the camera 722 may be included in the parking assistance apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

In addition, in some embodiments, a camera 722 or the microphone 723 may not be included in the input unit 720 but may be included in the sensing unit 760. The user input unit 724 is configured to receive information from the user. When information is input via the user input unit 724, the controller 770 may control the operation of the vehicle to correspond to the input information. The user input unit 724 may include a touch input unit or a mechanical input unit. In some embodiments, the user input unit 724 may be located in a region of the steering wheel. In this instance, the driver may operate the user input unit 724 with the fingers while gripping the steering wheel.

The sensing unit 760 is configured to sense signals associated with, for example, signals related to driving of the vehicle. Thus, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

In addition, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 may operate as a sensor. The biometric sensor may acquire hand geometry information and facial recognition information through the monitoring unit 725.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display. The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user.

In this instance, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

In addition, the display unit 741 may include a cluster to allow the driver to check vehicle state information or vehicle traveling information while driving the vehicle. The cluster may be located on a dashboard. In this instance, the driver may check information displayed on the cluster while looking forward.

In addition, in some embodiments, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the controller 170 into audio signals and to output the audio signals. Thus, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof. The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 can perform electronic control of a power source inside the vehicle. For example, when a fossil fuel based engine (not illustrated) is a power source, the power source drive unit 751 can perform electronic control of the engine. As such, the power source drive unit 751 may control, for example, an output torque of the engine. When the power source drive unit 751 is an engine, the power source drive unit 751 may control the speed of the vehicle by controlling the output torque of the engine under the control of the controller 770.

In another example, when an electric motor (not illustrated) is a power source, the power source drive unit 751 can perform control of the motor. As such, the power source drive unit 751 may control, for example, the RPM and torque of the motor. The steering drive unit 752 can perform electronic control of a steering apparatus inside the vehicle. The steering drive unit 752 may change the direction of travel of the vehicle.

The brake drive unit 753 can perform electronic control of a brake apparatus inside the vehicle. For example, the brake drive unit 753 may reduce the speed of the vehicle by controlling the operation of brakes located at wheels. In another example, the brake drive unit 753 may adjust the direction of travel of the vehicle leftward or rightward by differentiating the operation of respective brakes located at left and right wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 can perform control of a turn signal lamp or a brake lamp.

The air conditioner drive unit 755 can perform electronic control of an air conditioner inside the vehicle. For example, when the interior temperature of the vehicle is high, the air conditioner drive unit 755 may operate the air conditioner to supply cold air to the interior of the vehicle. The window drive unit 756 can perform electronic control of a window apparatus inside the vehicle. For example, the window drive unit 756 may control opening or closing of left and right windows of the vehicle.

The airbag drive unit 757 can perform the electronic control of an airbag apparatus inside the vehicle. For example, the airbag drive unit 757 may control an airbag to be deployed in a dangerous situation. The sunroof drive unit 758 can perform electronic control of a sunroof apparatus (not illustrated) inside the vehicle. For example, the sunroof drive unit 758 may control opening or closing of a sunroof.

The suspension drive unit 759 can perform electronic control of a suspension apparatus inside the vehicle. For example, when a road surface is uneven, the suspension drive unit 759 may control the suspension apparatus to reduce vibrations of the vehicle. The memory 730 is electrically connected to the controller 770. The memory 730 can store basic data of the unit, control data for operation control of the unit and input/output data. The memory 730 may be various storage apparatuses, which are implemented in a hardware manner, such as a ROM, RAM, EPROM, flash drive and hard drive. The memory 730 can store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 via the port. In this instance, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply unit 790 to the mobile terminal 600 under control of the controller 770.

The controller 770 may control the overall operation of each unit inside the vehicle. The controller 770 may be referred to as an Electronic Control Unit (ECU). The controller 770 can perform a function corresponding to the delivered signal according to delivery of a signal for executing the parking assistance apparatus 100. The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 can perform the role of the above-described processor 170. That is, the processor 170 of the parking assistance apparatus 100 can be directly set in the controller 770 of the vehicle. In such an embodiment, the parking assistance apparatus 100 can be understood as a combination of some components of the vehicle. Alternatively, the controller 770 may control the components to transmit information requested by the processor 170.

The power supply unit 790 may supply power required to operate the respective components under the control of the controller 770. In particular, the power supply unit 790 can receive power from, for example, a battery (not illustrated) inside the vehicle.

The AVN apparatus 400 may exchange data with the controller 770. The controller 770 can receive navigation information from the AVN apparatus or a separate navigation apparatus. Here, the navigation information may include destination information, information on a route to the destination, map information related to vehicle traveling and current position information of the vehicle.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

Further, although the embodiments have been mainly described until now, they are just exemplary and do not limit the present invention. Thus, those skilled in the art to which the present invention pertains will know that various modifications and applications which have not been exemplified may be performed within a range which does not deviate from the essential characteristics of the embodiments. For instance, the constituent elements described in detail in the exemplary embodiments can be modified to be performed. Further, the differences related to such modifications and applications shall be construed to be included in the scope of the present invention specified in the attached claims.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

What is claimed is:

1. A parking assistance apparatus for a vehicle, comprising:
    a camera configured to photograph surroundings of the vehicle;
    an interface configured to receive sensor information from the vehicle;
    a display configured to display a graphic image about an automatic parking function of the vehicle; and
    a processor configured to:
    initiate the automatic parking function by controlling the vehicle to travel to a target parking position,
    detect a traveling resistance of the vehicle from the sensor information while the vehicle is traveling to the target parking position,
    determine a factor causing the traveling resistance,
    continue controlling the vehicle to travel to the target parking position when the detected traveling resistance is less than a predetermined resistance, and
    change the controlling of the vehicle to travel to the target parking position to offset the factor causing the traveling resistance, when the detected traveling resistance is equal to or greater than the predetermined resistance.

2. The parking assistance apparatus of claim 1, wherein the processor is configured to:
    calculate a value of the traveling resistance based on a movement distance of the vehicle per an output of the vehicle, and when the value of the traveling resistance is equal to or greater than a predetermined value, determine that the traveling resistance occurs.

3. The parking assistance apparatus of claim 1, wherein the processor is configured to:
control the vehicle to stop, when the traveling resistance is detected, and
display the graphic image on the display inquiring of a user how to cope with the traveling resistance.

4. The parking assistance apparatus of claim 3, wherein the display is configured to display an image of the vehicle surroundings obtained by photographing the factor causing the traveling resistance before the traveling resistance occurs.

5. The parking assistance apparatus of claim 3, wherein the processor is configured to redesign a parking path avoiding the factor causing the traveling resistance, in response to a user input indicating the factor causing the traveling resistance should be avoided.

6. The parking assistance apparatus of claim 3, wherein the processor is configured to scan characteristics of the factor causing the traveling resistance, in response to a user input requesting the vehicle travel over the factor causing the traveling resistance.

7. The parking assistance apparatus of claim 6, wherein the processor is configured to:
calculate a correction output value for allowing the vehicle to pass over the factor causing the traveling resistance based on the characteristics of the factor of the traveling resistance, and
control a power unit of the vehicle according to the correction output value such that the vehicle passes over the factor causing the traveling resistance.

8. The parking assistance apparatus of claim 7, wherein the processor is configured to control the vehicle to travel in a creeping mode in which a basic torque is consistently provided to the vehicle.

9. The parking assistance apparatus of claim 8, wherein the processor is configured to control the vehicle to pass over the factor of the traveling resistance, by changing the basic torque of the creeping mode and outputting the correction output value in the creeping mode.

10. The parking assistance apparatus of claim 9, wherein, when the traveling resistance is detected from a front wheel of the vehicle, and after the front wheel has passed over the factor causing the traveling resistance, the processor is configured to change a torque of the vehicle back to the basic torque.

11. The parking assistance apparatus of claim 10, wherein the processor is configured to:
change the basic torque of the creeping mode before a back wheel of the vehicle passes over the factor causing the traveling resistance, and
output the correction output value in the creeping mode such that the vehicle passes over the factor causing the traveling resistance.

12. The parking assistance apparatus of claim 7, wherein the processor is configured to control the power unit of the vehicle such that the correction output value is output by controlling an output of the vehicle through an accelerator pedal of the vehicle.

13. The parking assistance apparatus of claim 1, wherein the processor is configured to control an output of the vehicle such that the vehicle travels at a speed within a preset speed range when the traveling resistance is detected while the vehicle travels on a slope.

14. The parking assistance apparatus of claim 13, wherein the processor is configured to acquire a gradient of the slope and calculate a correction output value based on the gradient, the correction output value being used to control the vehicle to travel on the slope at the speed within the preset speed range.

15. The parking assistance apparatus of claim 14, wherein the processor is configured to:
control the vehicle to travel in a creeping mode in which a basic torque is consistently provided to the vehicle, and
control the vehicle to pass over the factor causing the traveling resistance, by changing the basic torque of the creeping mode and outputting the correction output value in the creeping mode.

16. The parking assistance apparatus of claim 15, wherein the processor is configured to:
change the basic torque of the vehicle according to the gradient at a current position of the vehicle, and
re-correct the changed torque of the vehicle as the gradient varies due to traveling of the vehicle.

17. The parking assistance apparatus of claim 15, wherein the processor is configured to:
design a parking path for allowing the vehicle to travel to the target parking position,
acquire a gradient of the parking path, and
determine an output torque of the vehicle with respect to each section constituting the parking path.

18. The parking assistance apparatus of claim 13, wherein the processor is configured to control the speed of the vehicle within the preset speed range when the vehicle travels up or down the slope.

19. The parking assistance apparatus of claim 13, wherein the display is configured to display a parking path of the vehicle, a gradient of each section constituting the parking path, and the speed of the vehicle.

20. A vehicle comprising:
one or more wheels;
a power source configured to drive the one or more wheels; and
a parking assistance apparatus comprising:
a camera configured to photograph surroundings of the vehicle;
an interface configured to receive sensor information from the vehicle;
a display configured to display a graphic image about an automatic parking function of the vehicle; and
a processor configured to:
initiate the automatic parking function by controlling the vehicle to travel to a target parking position,
detect a traveling resistance of the vehicle from the sensor information while the vehicle is traveling to the target parking position,
determine a factor causing the traveling resistance,
continue controlling the vehicle to travel to the target parking position when the detected traveling resistance is less than a predetermined resistance, and
change the controlling of the vehicle to travel to the target parking position to offset the factor causing the traveling resistance, when the detected traveling resistance is equal to or greater than the predetermined resistance.

* * * * *